(12) United States Patent
Uehara et al.

(10) Patent No.: US 8,368,639 B2
(45) Date of Patent: Feb. 5, 2013

(54) PLANAR LIGHT SOURCE DEVICE, DISPLAY DEVICE, TERMINAL DEVICE, AND METHOD FOR DRIVING PLANAR LIGHT SOURCE DEVICE

(75) Inventors: Shinichi Uehara, Tokyo (JP); Ken Sumiyoshi, Tokyo (JP); Fujio Okumura, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/277,573

(22) Filed: Oct. 20, 2011

(65) Prior Publication Data

US 2012/0091925 A1   Apr. 19, 2012

Related U.S. Application Data

(62) Division of application No. 11/391,394, filed on Mar. 29, 2006, now abandoned.

(30) Foreign Application Priority Data

Apr. 4, 2005   (JP) ................................ 2005-107610

(51) Int. Cl.
    *G09G 3/36*   (2006.01)
(52) U.S. Cl. ........................ 345/102; 349/61; 362/97.2
(58) Field of Classification Search .............. 345/87–89, 345/98–100, 102, 211; 349/61–64, 112; 362/97.1–97.4; 315/169.3, 291–311
See application file for complete search history.

(56) References Cited

U.S. PATENT DOCUMENTS

| | | | |
|---|---|---|---|
| 5,831,698 A | 11/1998 | Depp et al. | |
| 7,205,973 B2 | 4/2007 | Ma et al. | |
| 2001/0019378 A1 | 9/2001 | Ymaguchi | |
| 2002/0041280 A1 | 4/2002 | Woo | |
| 2002/0070911 A1 | 6/2002 | Koma | |
| 2002/0140886 A1 | 10/2002 | Sugiura et al. | |
| 2003/0201969 A1* | 10/2003 | Hiyama et al. | 345/102 |
| 2006/0109396 A1 | 5/2006 | Tsai et al. | |

FOREIGN PATENT DOCUMENTS

| | | |
|---|---|---|
| CN | 1423245 A | 6/2003 |
| JP | 5-72529 A | 3/1993 |
| JP | 9-244018 A | 9/1997 |
| JP | 10-319384 A | 12/1998 |
| JP | 11-142819 A | 5/1999 |
| JP | 2002-049037 A | 2/2002 |

* cited by examiner

*Primary Examiner* — Liliana Cerullo
(74) *Attorney, Agent, or Firm* — Sughrue Mion, PLLC

(57) ABSTRACT

A display device is provided including an optical waveguide, and a light source, and also a louver, a transparent/scattering state switching element, and a transmissive liquid crystal display panel, provided in order on the side of a light-emitting surface of the optical waveguide. The transparent/scattering state switching element switches between a state for scattering the incident light and a state for transmitting the light without scattering. The light source drive circuit causes the transparent/scattering state switching element to transfer from the transparent state to the scattering state, and when the viewing angle range of the display is switched from narrow to wide, the intensity of the light source is gradually increased in conjunction with the transition state of the transparent/scattering state switching element.

3 Claims, 19 Drawing Sheets

VOLTAGE

HAZE

CURRENT

INTENSITY

TRANMITTANCE

LUMINANCE

VOLTAGE

HAZE

CURRENT

INTENSITY

TRANMITTANCE

LUMINANCE

PLANAR LIGHT SOURCE DEVICE, DISPLAY DEVICE, TERMINAL DEVICE, AND METHOD FOR DRIVING PLANAR LIGHT SOURCE DEVICE

CROSS-REFERENCE TO RELATED APPLICATION

This application is a divisional of U.S. patent application Ser. No. 11/391,394 filed Mar. 29, 2006, which is based upon and claims the benefit of priority from Japanese Patent Application No. 2005-107610 filed on Apr. 4, 2005, the contents of all of which are incorporated herein by reference in their entirety.

BACKGROUND OF THE INVENTION

1. Field of the Invention

The present invention relates to a planar light source device capable of switching the radiation angle of illuminating light, to a display device provided with this planar light source device and capable of switching the angle range of visibility, to a terminal device equipped with this display device, and to a method for driving the planar light source device.

2. Description of the Related Art

Because of their thin profile, light weight, small size, low energy consumption, and other advantages, display devices that use liquid crystals have been widely deployed and used in a range of devices that includes monitors, televisions (TV: Television), and other large terminal devices; notebook-type personal computers, cash dispensers, vending machines, and other mid-sized terminal devices; and personal TVs, PDAs (Personal Digital Assistance: personal information terminal), mobile telephones, mobile gaming devices, and other small terminal devices. These liquid crystal display devices can be generally classified as transmissive, reflective, or transflective (using transmitted light and reflected light jointly) according to the type of light source used. Energy consumption can be reduced in the reflective type, since it can utilize external light in the display device, but contrast and other aspects of display performance are inferior compared to the transmissive type. Therefore, transmissive and transflective liquid crystal display devices are currently in the mainstream. In transmissive and transflective liquid crystal display devices, a light source is installed on the back surface of a liquid crystal panel, and a display is created using the light emitted by the light source. Specifically, a light source that is separate from the liquid crystal panel is essential in current mainstream liquid crystal display devices.

In the liquid crystal panel that is the primary component of a liquid crystal display device, information is displayed by using an electric field to control the orientation of liquid crystal molecules, and numerous modes have been proposed according to the combination of the type and initial orientation of the liquid crystal molecules, the direction of the electric field, and other characteristics. Among these modes, the modes most often used in a conventional terminal device include an STN (Super Twisted Nematic) mode using a simple matrix structure, and a TN (Twisted Nematic) mode using an active matrix structure. However, a liquid crystal panel that uses these modes has a narrow range of angles in which contrasts can be correctly distinguished, and grayscale inversion occurs outside the optimum viewing position.

This problem of grayscale inversion was relatively insignificant in mobile telephones and other terminal devices when the display content consisted mainly of telephone numbers and other characters. However, with recent technological development, terminal devices have come to display not only text information, but also large amounts of image information. The visibility of images is therefore severely reduced by grayscale inversion. Liquid crystal panels that use a mode having a wide range of angles at which contrast can be correctly distinguished without the occurrence of grayscale inversion are therefore gradually being installed in terminal devices. Liquid crystal panels having this type of mode are referred to generically as wide-viewing-angle liquid crystal panels, and IPS (In-Plane Switching) systems and other horizontal field modes, multi-domain vertical alignment modes, and the like are applied therein. Since gradation can be correctly distinguished in a wide range of angles by using these wide-viewing-angle liquid crystal panels, even though a medium-sized terminal device is basically a personal tool, applications for sharing information with others that can be appreciated by multiple people simultaneously are gradually being developed and installed.

On the other hand, medium-sized terminal devices are characteristically used not only in closed rooms under tight security, but also in public places. It then becomes important to keep displays of private information and confidential information from being viewed by a third party. Particularly in recent years, occasions where private information and confidential information are displayed have increased in conjunction with the development of terminal devices, and demand for eavesdropping prevention techniques is increasing. There is therefore a desire to develop a technique capable of preventing eavesdropping and to enable the display to be viewed only by the user by narrowing the range of angles in which the display is visible; specifically, by narrowing the range of viewing angles.

As described above, a display having a wide range of viewing angles that can be appreciated by multiple people simultaneously, and a display having a narrow range of viewing angles that can be viewed only by the user are both desired. The ability to switch between these two types of displays in a single terminal device is also desired. Therefore, in order to satisfy such requirements, a display device has been proposed in which the light source essential to the liquid crystal display device is designed so that the range of viewing angles can be changed.

FIG. 15 is a schematic sectional view showing the first conventional viewing-angle-controlled liquid crystal display device described in JP-A 5-72529. As shown in FIG. 15, the first conventional viewing-angle-controlled liquid crystal display device 1001 is composed of a liquid crystal element 1170 that is capable of controlling scattering; and a liquid crystal element 1180 that is capable of controlling optical rotation and double refraction properties. The liquid crystal element 1170 that is capable of controlling scattering is composed of substrates 1110 and 1111 that are optically transparent in the visible region, transparent electrodes 1120 and 1121, a scattering liquid crystal 1130, a voltage supply source 1100, and a switch 1190. The liquid crystal element 1180 that is capable of controlling optical rotation and double refraction properties is composed of transparent substrates 1111 and 1112 that are optically transparent in the visible region, transparent electrodes 1122 and 1123, polarizers 1140 and 1141, orientation films 1150 and 1151, a liquid crystal layer 1160 having optical rotation and double refraction properties, a voltage supply source 1101, and a switch 1191. Polymer-dispersed liquid crystal is used as the scattering liquid crystal 1130, and TN liquid crystal is used as the liquid crystal 1180 that is capable of controlling optical rotation and double refraction properties. The polarizers 1140 and 1141 are arranged as a crossed Nicol.

In the first conventional viewing-angle-controlled liquid crystal display device thus configured, a voltage is applied between the transparent electrodes 1122 and 1123, whereby the optical rotation and double refraction properties of the liquid crystal layer 1160 are changed, and this change can be used to control the transmittance of light. In this type of display mode that utilizes optical rotation and double refraction properties, the optical rotation and double refraction properties that essentially affect the incident light differ according to the direction of the viewing angle. A phenomenon therefore occurs in which the luminance and chroma are reduced or inverted depending on the viewing angle. A liquid crystal element 1170 that is capable of controlling scattering is therefore disposed at the top of this type of viewing-angle-dependent liquid crystal element 1180, and the viewing angle dependency is reduced. Specifically, since the liquid crystal molecules are randomly oriented when an electric field is not applied to the liquid crystal 1130 of the liquid crystal element 1170 that is capable of controlling scattering, nearly isotropic scattering occurs throughout the entire range of viewing angles, and a display can be obtained that has little dependency on the viewing angle. When an electric field is applied to the liquid crystal 1130, the liquid crystal molecules orient themselves substantially parallel to the electric field. The light emitted from the liquid crystal element 1180 is therefore emitted without being scattered by the liquid crystal molecules. The visual characteristics do not improve at this time, but when the display need only be correctly recognized by a single user, the viewing angle characteristics resemble those of a conventional TN liquid crystal, and a user can use the display without the display being correctly recognized by another person.

FIG. 16 is a schematic sectional view showing the second conventional viewing-angle-controlled liquid crystal display device described in JP-A 9-244018; and FIG. 17 is a schematic perspective view showing the illumination device used in this viewing-angle-controlled liquid crystal display device. As shown in FIG. 16, the second conventional viewing-angle-controlled liquid crystal display device 2101 is composed of a liquid crystal display element 2102, a scatter control element (scatter control means) 2103, and an illumination device (backlight) 2104. The scatter control element 2103 is disposed between the liquid crystal display element 2102 and the illumination device 2104. As shown in FIG. 17, the illumination device 2104 is provided with an opaque slitted sheet (translucent sheet) 2120 and an irradiating unit 2121. A fluorescent tube or other light source 2122 is provided to the irradiating unit 2121, and a light-emitting surface 2123 for emitting the light from the light source 2122 and guiding the light to the opaque slitted sheet 2120 is formed. A reflecting sheet 2124 for reflecting the light from the light source 2122 is provided in the irradiating unit 2121 on the surface facing the light-emitting surface 2123. In the opaque slitted sheet 2120, a plurality of linear opaque members extending in one direction are arranged parallel to each other on one surface of a translucent sheet. The extension direction of the opaque members coincides with the vertical direction of the display screen.

In the second conventional viewing-angle-controlled liquid crystal display device thus configured, the light emitted from the light source 2122 is emitted from the light-emitting surface 2123 of the irradiating unit 2121, and is radiated to the scatter control element 2103 via the opaque slitted sheet 2120. When the light emitted from the light-emitting surface 2123 passes through the opaque slitted sheet 2120, the opaque slitted sheet 2120 blocks light that is incident from directions that are significantly tilted with respect to the light-incident surface of the opaque slitted sheet 2120. Transmitted light is thereby obtained that is highly parallel to the direction perpendicular to the surface of the opaque slitted sheet 2120. The light emitted from the illumination device 2104 then enters the scatter control element 2103. The scatter control element 2103 controls the scattering properties of the incident light rays according to the presence of an applied voltage. When the scatter control element 2103 is in a scattering state, the light emitted from the illumination device 2104 is scattered by the scatter control element 2103; and when the scatter control element 2103 is in a transparent state, the light from the illumination device 2104 is not scattered.

In the second conventional viewing-angle-controlled liquid crystal display device 2101 configured as described above, the highly collimated light emitted from the illumination device 2104 is scattered by the scatter control element 2103 and caused to enter the liquid crystal display element 2102 when the scatter control element 2103 is in the scattering state. As a result, the light that has passed through the liquid crystal display element 2102 is released in all directions in the viewing angle of the display unit, and it becomes possible to recognize the displayed content also from positions other than the position directly in front of the display unit. In contrast, when the scatter control element 2103 is in the transparent state, the highly collimated light emitted from the illumination device 2104 is caused to enter the liquid crystal display element 2102 while still maintaining a high degree of collimation, without being scattered by the scatter control element 2103. As a result, light is not transmitted to positions where the display unit is viewed at an angle to the left or right in the horizontal direction, the screen is darkened when viewed from such a position, and it becomes impossible to recognize the displayed content. In other words, only an observer who is directly facing the display unit can recognize the displayed content.

As described above, since the scattering properties of the light can be controlled by the scatter control element 2103 in the second conventional viewing-angle-controlled liquid crystal display device 2101 having the abovementioned configuration, the viewing angle characteristics of the displayed content can be controlled. Furthermore, since highly collimated light can be emitted towards the liquid crystal display element 2102 by the illumination device 2104, it is possible to reliably obtain viewing angle characteristics in which only an observer directly facing the display unit can recognize the displayed content when the scatter control element 2103 is placed in the transparent state. Consequently, it is possible to obtain a liquid crystal display device that is capable of arbitrarily switching between a state in which display characteristics are uniformly maintained in all viewing angle directions with little dependence on viewing angle, and a state in which the displayed content can be recognized only from a position directly facing the display unit.

However, in the aforementioned first and second conventional viewing-angle-controlled liquid crystal display devices, there is abnormal flashing that causes discomfort for the user when the switch is made from narrow-angle display having a narrow range of viewing angles to wide-angle display having a wide range of viewing angles.

SUMMARY OF THE INVENTION

An object of the present invention is to provide a planar light source device capable of switching the range of radiation angles, wherein the planar light source device can prevent abnormal flashing when the radiation angle is switched; to provide a display device that is equipped with this planar light source device and is capable of switching the range of viewing angles; to provide a terminal device in which this display device is installed; and to provide a method for driving the planar light source device.

The planar light source device according to a first aspect of the present application has a light source unit for emitting light in a plane; a transparent/scattering state switching element capable of switching between a transparent state for transmitting the light incident from the light source unit, and a scattering state for scattering the light; and a control unit for controlling the intensity of the light source unit and the state of the transparent/scattering state switching element; wherein the control unit gradually increases the intensity of the light source unit in conjunction with the transition state of the transparent/scattering state switching element when the transparent/scattering state switching element is transferred from the transparent state to the scattering state.

In the present invention, the control unit gradually increases the intensity of the light source unit in conjunction with the transition state of the transparent/scattering state switching element when the transparent/scattering state switching element is transferred from the transparent state to the scattering state. It is therefore possible to suppress abnormal flashing in which the frontal luminosity of the planar light source device suddenly increases in a brief period of time.

It is also preferred that the control unit gradually reduce the intensity of the light source unit in conjunction with the transition state of the transparent/scattering state switching element when the transparent/scattering state switching element is transferred from the scattering state to the transparent state. By this configuration, a decrease in the frontal luminance of the planar light source device can be minimized during the transition.

The planar light source device according to a second aspect of the present application has a light source unit for emitting light in a plane; a transparent/scattering state switching element capable of switching between a transparent state for transmitting the light incident from the light source unit, and a scattering state for scattering the light; and a control unit for controlling the intensity of the light source unit and the state of the transparent/scattering state switching element; wherein the control unit increases the intensity of the light source unit after the start of the transition in which the transparent/scattering state switching element is transferred from the transparent state to the scattering state.

In the present invention, by increasing the intensity of the light source unit after the start of the transition when the transparent/scattering state switching element is transferred from the transparent state to the scattering state, the intensity of the light source unit can be prevented from being increased while the transparent/scattering state switching element is still in the transparent state. Abnormal flashing can therefore be suppressed.

It is also preferred that the control unit increase the intensity of the light source unit after the transition is completed in the transparent/scattering state switching element. Abnormal flashing can thereby be reliably prevented from occurring.

Furthermore, it is preferred that the control unit reduce the intensity of the light source unit before the start of the transition when the transparent/scattering state switching element is transferred from the scattering state to the transparent state. Abnormal flashing can thereby be prevented from occurring.

The planar light source device according to a third aspect of the present application has a light source unit for emitting light in a plane; a transparent/scattering state switching element capable of switching between a transparent state for transmitting the light incident from the light source unit, and a scattering state for scattering the light; and a control unit for controlling the intensity of the light source unit and the state of the transparent/scattering state switching element; wherein the control unit reduces the intensity of the light source unit during the transition period in which the transparent/scattering state switching element is transferred from the transparent state to the scattering state.

In the present invention, by reducing the intensity of the light source unit during the transition period, the state of the transparent/scattering state switching element can be prevented from being reflected in the display. Abnormal flashing can thereby be prevented from occurring. The switching of the transparent/scattering state switching element can also be indicated to a user positioned in front of the planar light source device.

The control unit preferably turns off the light source unit during the transition period. The control unit may also reduce the intensity of the light source unit or turn off the light source unit during the transition period in which the transparent/scattering state switching element is transferred from the scattering state to the transparent state.

The planar light source device according to a fourth aspect of the present application has a light source unit for emitting light in a plane; a transparent/scattering state switching element capable of switching between a transparent state for transmitting the light incident from the light source unit, and a scattering state for scattering the light; and a control unit for controlling the intensity of the light source unit and the state of the transparent/scattering state switching element; wherein the control unit adjusts the intensity of the light source unit during the transition period in which the transparent/scattering state switching element is transferred from the transparent state to the scattering state, so that the luminance in the direction having the highest luminance of the light emitted from the light source unit and transmitted through the transparent/scattering state switching element when the transparent/scattering state switching element is in the transparent state does not become higher than the luminance before and after the transition period.

In the present specification, the luminance in the direction having the highest luminance of the light emitted from the light source unit and transmitted through the transparent/scattering state switching element when the transparent/scattering state switching element is in the transparent state is referred to as the frontal luminance.

The light source unit also preferably has a light-emitting diode. The effects of the present invention are made particularly significant by a light-emitting diode, due to its rapid response with respect to the drive circuit.

It is also preferred that the planar light source device have a light-direction regulating element for regulating the light-direction of the light emitted from the light source unit and emitting the light to the transparent/scattering state switching element. By this configuration, the directivity of the light emitted from the light source unit is increased, the amount of light at oblique angles can be reduced during radiation in a narrow range, and the effects of switching the radiation range can be enhanced.

The display device according to a fifth aspect of the present application has the planar light source device, and a transmissive display panel for associating an image with the light by transmitting the light emitted from the planar light source device.

In the present invention, since the angle range of the light radiated by the planar light source device can be switched, the viewing angle of the display device can be switched. A display panel having transmissive display areas in its pixels is suitable for use in the display device according to the present invention.

The display device according to a sixth aspect of the present application has a light source unit for emitting light in a plane; a transparent/scattering state switching element capable of switching between a transparent state for transmitting the light incident from the light source unit, and a scattering state for scattering the light; a transmissive display panel for associating an image with the light by transmitting the light emitted from the transparent/scattering state switching element; and a control unit for controlling the intensity of the light source unit, the state of the transparent/scattering state switching element, and the transmissive display panel; wherein the control unit reduces the transmittance of the transmissive display panel during the transition period in which the transparent/scattering state switching element is transferred from the transparent state to the scattering state.

In the present invention, by reducing the transmittance of the transmissive display panel during the transition period in which the transparent/scattering state switching element is transferred from the transparent state to the scattering state, abnormal flashing can be prevented from occurring. The switching can also be indicated to a user positioned in front of the display device. Furthermore, there is no need for separate adjustment with respect to the light source unit and the transparent/scattering state switching element, and abnormal flashing during switching can be minimized by changing the content displayed on the transmissive display panel.

The transmittance may also be decreased by displaying black color in the transmissive display panel. Abnormal flashing can thereby be reliably prevented.

Furthermore, the light source unit preferably has a light-emitting diode. A light-emitting diode has a rapid response with respect to the drive circuit, and can therefore be suitably applied in the present invention.

It is also preferred that the display device have a light-direction regulating element for regulating the light-direction of the light emitted from the light source unit and emitting the light to the transparent/scattering state switching element. By this configuration, the directivity of the light emitted from the light source can be increased, and effects can be enhanced whereby eavesdropping is prevented during display in a narrow viewing angle.

Furthermore, the transmissive display panel may be a liquid crystal panel. In this instance, the liquid crystal panel preferably operates on a lateral field principle, a multi-domain vertical alignment principle, or a film-compensated TN principle. By this configuration, grayscale inversion can be minimized in the display, and visibility can be enhanced when the transparent/scattering state switching element is in the scattering state.

The terminal device according to a seventh aspect of the present application has the aforementioned display device.

This terminal device may also be a mobile telephone, a personal information terminal, a gaming device, a digital camera, a video camera, a video player, a notebook-type personal computer, a cash dispenser, or a vending machine.

The method for driving a planar light source device according to an eight aspect of the present application comprises the steps of causing a light source unit to emit light in a plane; and switching the state of a transparent/scattering state switching element on which the light is incident between a transparent state for transmitting the light and a scattering state for scattering the light, and causing light to be emitted from the transparent/scattering state switching element; wherein the method for driving a planar light source device comprises gradually increasing the intensity of the light source unit in conjunction with the transition from the transparent state to the scattering state in the transparent/scattering state switching element.

The method for driving a planar light source device according to a ninth aspect of the present application comprises the steps of causing a light source unit to emit light in a plane; and switching the state of a transparent/scattering state switching element on which the light is incident between a transparent state for transmitting the light and a scattering state for scattering the light, and causing light to be emitted from the transparent/scattering state switching element; wherein the method for driving a planar light source device comprises increasing the intensity of the light source unit after the transition from the transparent state to the scattering state has been started by the transparent/scattering state switching element.

The method for driving a planar light source device according to a tenth aspect of the present application comprises the steps of causing a light source unit to emit light in a plane; and switching the state of a transparent/scattering state switching element on which the light is incident between a transparent state for transmitting the light and a scattering state for scattering the light, and causing light to be emitted from the transparent/scattering state switching element; wherein the method for driving a planar light source device comprises reducing the intensity of the light source unit during the transition period in which the transparent/scattering state switching element is transferred from the transparent state to the scattering state.

The method for driving a planar light source device according to an eleventh aspect of the present application comprises the steps of causing a light source unit to emit light in a plane; and switching the state of a transparent/scattering state switching element on which the light is incident between a transparent state for transmitting the light and a scattering state for scattering the light, and causing light to be emitted from the transparent/scattering state switching element; wherein the method for driving a planar light source device comprises adjusting the intensity of the light source unit during the transition period in which the transparent/scattering state switching element is transferred from the transparent state to the scattering state, so that the luminance in the direction having the highest luminance of the light emitted from the light source unit and transmitted through the transparent/scattering state switching element when the transparent/scattering state switching element is in the transparent state does not become higher than the luminance before and after the transition period.

It is also preferred that the transparent/scattering state switching element be disposed between a pair of electrodes and provided with a layer that is switched between a transparent state and a scattering state according to the application of a voltage by the electrodes; wherein the pair of electrodes are short-circuited with each other when a voltage is not applied to the layer. By this configuration, the speed of the response can be increased when the transparent/scattering state switching element is off.

By the present invention, abnormal flashing during switching of the radiation angle can be prevented in a planar light source device that is capable of switching the range of the radiation angle, by increasing the intensity of the light source unit in conjunction with the transition state of the transparent/scattering state switching element when the transparent/scattering state switching element is transferred from the transparent state to the scattering state.

BRIEF DESCRIPTION OF THE DRAWINGS

FIG. 4E has the frontal luminance of the display device plotted on the vertical axis;

FIG. 9B has the haze of the transparent/scattering state switching element plotted on the vertical axis, FIG. 9C has the output current of the light source drive circuit plotted on the vertical axis, FIG. 9D has the intensity of the light source plotted on the vertical axis, and FIG. 9E has the frontal luminance of the display device plotted on the vertical axis;

FIG. 13E has the transmittance of the transmissive liquid crystal display device panel plotted on the vertical axis, and FIG. 13F has the frontal luminance of the display device plotted on the vertical axis;

DESCRIPTION OF THE PREFERRED EMBODIMENTS

The inventors conducted a concentrated investigation of the causes of abnormal flashing in order to overcome the problems of the prior art described above. As a result, they discovered that the difference in the response times of the scatter control element and the light source contributes to abnormal flashing, which becomes a significant problem particularly during the switch from narrow-angle display, in which the range of radiation angles is narrow, to wide-angle display, in which the range of radiation angles is wide. Following is a detailed description of the mechanism by which abnormal flashing occurs in the conventional viewing-angle-controlled display.

Figure 18:
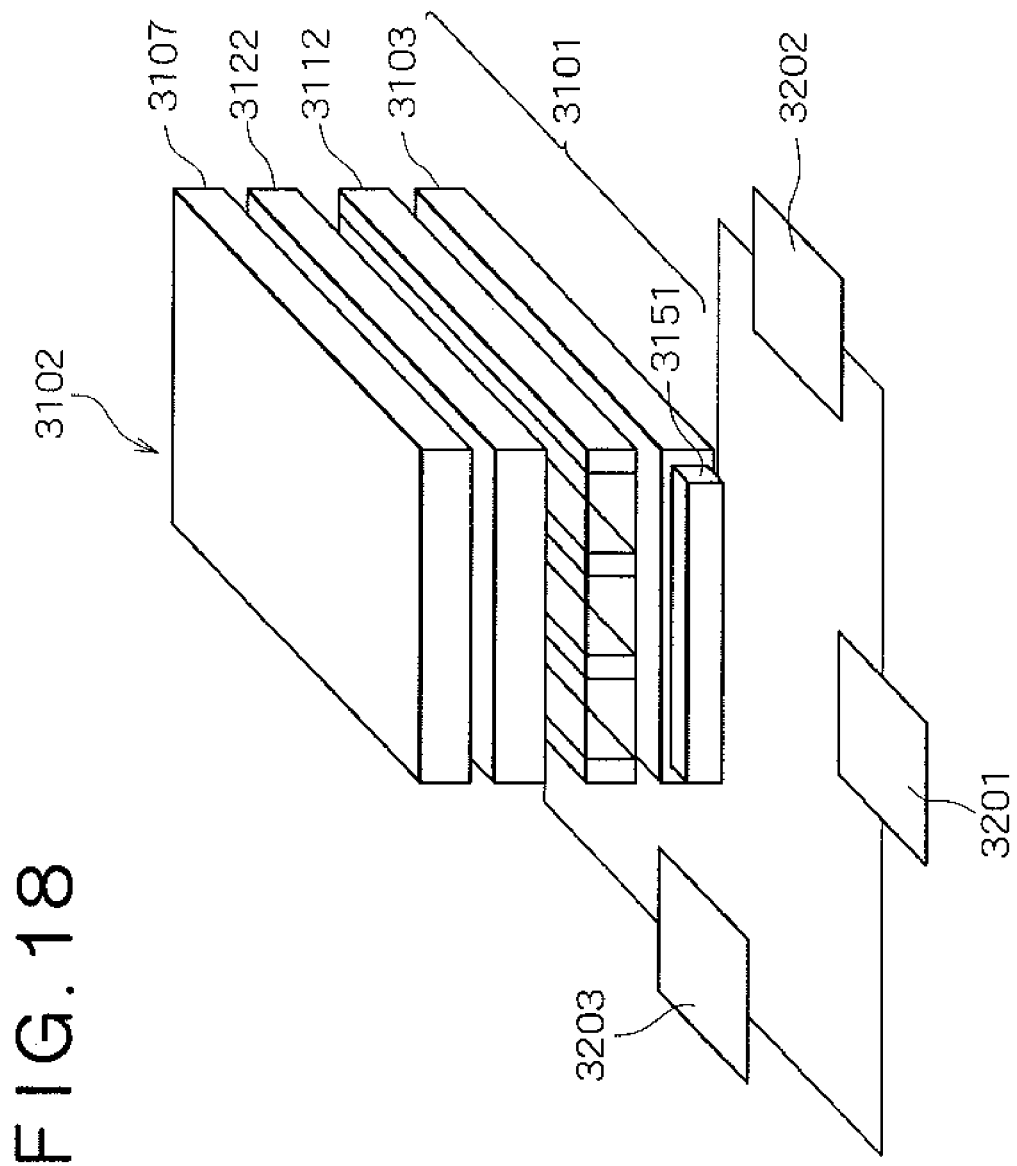
FIG. 18 is a perspective view showing the viewing-angle-controlled display device according to a comparative example of the present invention.

FIG. 18 is a perspective view showing the viewing-angle-controlled display according to a comparative example of the present invention. The display device of the comparative example shown in FIG. 18 will be used to describe the mechanism by which abnormal flashing occurs in the conventional viewing-angle-controlled display device. As shown in FIG. 18, the viewing-angle-controlled liquid crystal display device 3102 is composed of a backlight 3101 having a light source 3151 and a light-guiding member 3103; a light-direction regulating element 3112 disposed on the side of the light-emitting surface of the backlight 3101; a transparent/scattering state switching element 3122 disposed on the side of the light-emitting surface of the light-direction regulating element 3112; a transmissive liquid crystal panel 3107 disposed on the side of the light-emitting surface of the transparent/scattering state switching element 3122; a light source drive circuit 3202 for driving the light source 3151; a transparent/scattering element drive circuit 3203 for driving the transparent/scattering state switching element 3122; and a control circuit 3201 for controlling the light source drive circuit 3203 and the transparent/scattering element drive circuit 3203.

The light source 3151 is composed of a plurality of LED (Light-Emitting Diode: light-emitting diode) disposed on the side of the light-incident surface of the light-guiding member 3103, for example. The light-direction regulating element 3112 is a louver, for example, in which transparent areas for transmitting light and absorbent areas for absorbing light are arranged in alternating fashion in the direction parallel to the surface of the louver. The direction in which the transparent areas and absorbent areas are arranged is orthogonal to the normal line of the light-incident surface of the light-guiding member 3103. The transparent/scattering state switching element 3122 is composed of polymer-dispersed liquid crystal in which liquid crystal molecules are dispersed in a polymer matrix. Since the apparent refractive index of the polymer matrix differs from that of the liquid crystal molecules when an electric field is not applied to the polymer-dispersed liquid crystal, a scattering state occurs in which the incident light is scattered and emitted. When an electric field is applied, the apparent refractive indices of the polymer matrix and the liquid crystal molecules are substantially the same, and a transparent state occurs in which the incident light is emitted without being scattered. A rectangular pulse at 60 Hz is applied to the transparent/scattering state switching element in order to prevent burn-in.

The operation of the viewing-angle-controlled liquid crystal display device 3102 will next be described. The case of wide-angle display will first be described. When the control circuit 3201 receives an instruction for wide-angle display, the light source drive circuit 3202 is controlled so as to cause the light source 3151 to emit light, and the transparent/scattering element drive circuit 3203 is controlled so that the transparent/scattering state switching element 3122 is placed in the scattering state. As a result, the light source 3151 turns on, and the light emitted from the light source 3151 is propagated through the light-guiding member 3103 and emitted in a plane from the backlight 3101. The light that is incident on the light-direction regulating element 3112 and endowed with increased directivity is then incident on the transparent/scattering state switching element 3122. Since the transparent/scattering state switching element 3122 is in the scattering state with no voltage applied, the high-directivity light is evenly scattered by the transparent/scattering state switching element 3122 and dispersed in a wide range of angles. Specifically, the light whose directivity is increased by the light-direction regulating element 3112 is scattered by the transparent/scattering state switching element 3122, the directivity of the light is reduced, and the angle of the light is widened. This light that is distributed in an increased range of angles enters the transmissive liquid crystal panel 3107, and is emitted without modification as wide-angle light. An image is thus displayed in a wide viewing angle.

The case of narrow-angle display will next be described. When the control circuit 3201 receives an instruction for narrow-angle display, the light source drive, circuit 3202 is controlled so as to cause the light source 3151 to emit light, and the transparent/scattering element drive circuit 3203 is controlled so that the transparent/scattering state switching element 3122 is placed in the transparent state. As a result, the light source 3151 turns on, and the light emitted from the light source 3151 is propagated through the light-guiding member 3103 and emitted in a plane from the backlight 3101. The light that is incident on the light-direction regulating element 3112 and endowed with increased directivity is then incident on the transparent/scattering state switching element 3122. Since the transparent/scattering state switching element 3122 is in the transparent state with a voltage applied, the high-directivity light is transmitted without being scattered by the transparent/scattering state switching element 3122. Specifically, the light whose directivity is increased by the light-direction regulating element 3112 is emitted by the transparent/scattering state switching element 3122 while still maintaining its high-directivity distribution. This light having high directivity enters the transmissive liquid crystal panel 3107, and is emitted while still having high directivity. An image is thus displayed in a narrow viewing angle.

In the viewing-angle-controlled liquid crystal display device thus configured, when the intensity of the light source 3151 is the same in both the state of narrow-angle display and the state of wide-angle display, the frontal luminance is reduced in the state of wide-angle display compared to the state of narrow-angle display. The reason for this is that the light emitted from the transmissive liquid crystal panel 3107 in the narrow-viewing-angle state retains the increased directivity caused by the light-direction regulating element 3112. On the other hand, in the wide-viewing-angle state, the light whose directivity is increased by the light-direction regulating element 3112 is scattered by the transparent/scattering state switching element 3122, the amount of luminous flux proceeding in the frontal direction is reduced, and the frontal luminance decreases by a commensurate amount.

It is preferable for the main user in the frontal direction to not experience any change in luminance between narrow-angle display and wide-angle display. Therefore, in order to prevent the frontal luminance from decreasing during the switch from narrow-angle display to wide-angle display, the current that flows to the LED constituting the light source 3151 must be increased so that the intensity of the LED is increased, and the frontal luminance is prevented from decreasing. In the same manner, when switching from wide-angle display to narrow-angle display, the amount of current that flows to the LED constituting the light source 3151 decreases, and the intensity of the LED is reduced in order to prevent a significant increase in the frontal luminance. Thus, not only must the transparent/scattering state of the transparent/scattering state switching element 3122 be switched during the switch between narrow-angle display and wide-angle display, but the intensity of the light source 3151 must also be switched at the same time.

In actual practice, however, the transparent/scattering state switching element 3122 and the light source 3151 have different response times. The switching effects therefore occur at different times, due to the difference in response times when these components are switched simultaneously. Specifically, since the polymer-dispersed liquid crystal that constitutes the transparent/scattering state switching element 3122 is composed of liquid crystal molecules, the response thereof is relatively slow, and a response time of tens of milliseconds to hundreds of milliseconds is required. The response time tends to be longer when the voltage is blocked (OFF state), particularly with respect to the response time when a voltage is applied (ON state). This is because the orientation of the liquid crystal molecules is changed by the effects of the electric field that acts on all the liquid crystal molecules simultaneously when the voltage is on, whereas the liquid crystal molecules are gradually returned to their initial orientation by the orientation-regulating force of the polymer interface when the voltage is off. On the other hand, the LED constituting the light source has a relatively fast response time, which is a few microseconds for a single color, and a few milliseconds in an LED of the type in which a phosphor is excited to obtain white light.

Figure 19A:
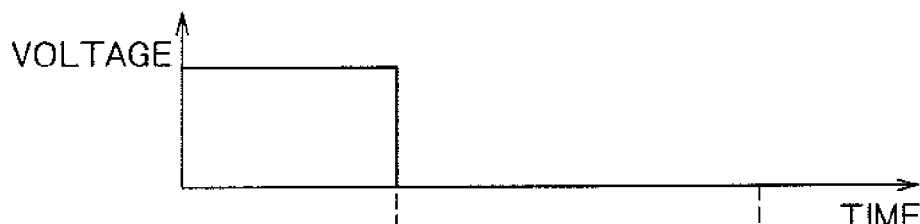
FIGS. 19A through 19E are timing charts showing the state change when the viewing-angle-controlled liquid crystal display device of the comparative example shown in FIG. 18 is switched from narrow-angle display to wide-angle display, wherein time is plotted on the horizontal axis of each chart, FIG. 19A has the output voltage of the drive circuit for the transparent/scattering state switching element plotted on the vertical axis, FIG. 19B has the haze (HAZE: haze value) of the transparent/scattering state switching element plotted on the vertical axis, FIG. 19C has the output current of the light source drive circuit plotted on the vertical axis, FIG. 19D has the intensity of the light source plotted on the vertical axis, and FIG. 19E has the frontal luminance of the display device plotted on the vertical axis.
Figure 19B:
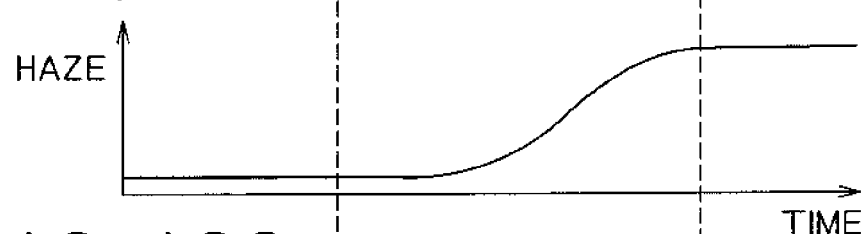
Figure 19C:
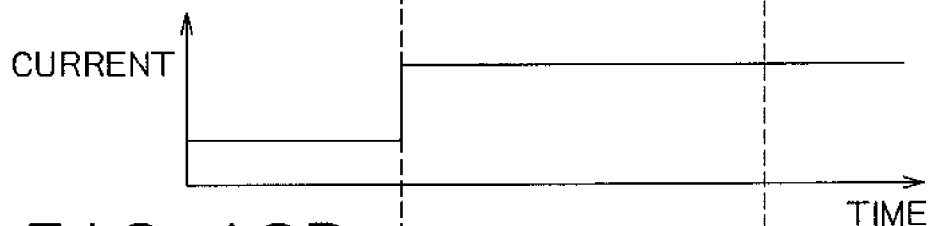
Figure 19D:
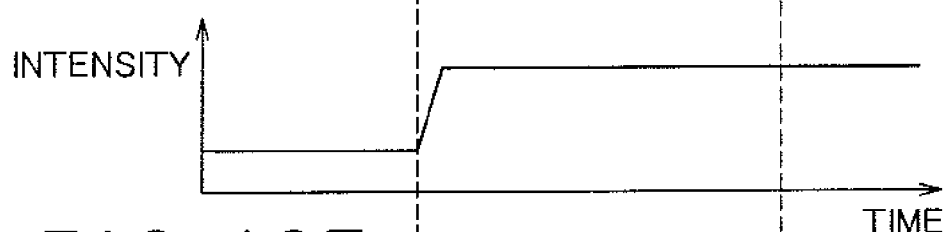
Figure 19E:
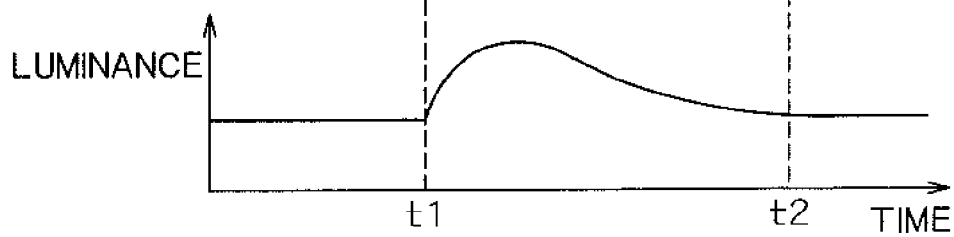

FIGS. 19A through 19E are timing charts showing the state change when the viewing-angle-controlled liquid crystal display device of the comparative example shown in FIG. 18 is switched from narrow-angle display to wide-angle display, wherein time is plotted on the horizontal axis of each chart, FIG. 19A has the output voltage of the drive circuit for the transparent/scattering state switching element plotted on the vertical axis, FIG. 19B has the haze (HAZE: haze value) of the transparent/scattering state switching element plotted on the vertical axis, FIG. 19C has the output current of the light source drive circuit plotted on the vertical axis, FIG. 19D has the intensity of the light source plotted on the vertical axis, and FIG. 19E has the frontal luminance of the display device plotted on the vertical axis.

When the viewing-angle-controlled liquid crystal display device 3102 is switched from narrow-angle display to wide-angle display, the output voltage of the drive circuit for the transparent/scattering state switching element is switched from ON to OFF at time t1, as shown in FIG. 19A. The haze of the transparent/scattering state switching element 3122 is thereby increased, as shown in FIG. 19B. As described above, since the response of the transparent/scattering state switching element at this time is slow when OFF, a relatively long time is required from time t1 when the applied voltage is switched OFF to time t2 when the haze increases to saturation.

As shown in FIG. 19C, the output current of the light source drive circuit 3202 is increased, and the intensity of the LED constituting the light source 3151 is also increased simultaneously with the switching of the transparent/scattering state switching element. At this time, the response of the LED is relatively fast, and its intensity increases in a short time as shown in FIG. 19D. As a result, during the period from the start time t1 of the switch from narrow-angle display to wide-angle display until the time t2 at which the haze of the transparent/scattering state switching element increases and stabilizes, a state occurs in which the haze value of the transparent/scattering state switching element is small, and the intensity of the light source is high. As shown in FIG. 19E, the frontal luminance increases since most of the luminous flux in this state proceeds in the frontal direction without being scattered by the transparent/scattering state switching element. As time t2 approaches, the haze of the transparent/scattering state switching element becomes saturated, and the frontal luminance stabilizes. Thus, during the transitional period during the switch from narrow-angle display to wide-angle display, specifically, in the period from time t1 to time t2, abnormal flashing occurs in which the luminance of the whole display screen as viewed from the front of the display device increases sharply within a brief period of time, which causes discomfort for the user.

A case is described above in which an LED is used as the constituent element of the light source 3151, but the same phenomenon causes problems when a cold cathode tube is used instead of an LED. This is because the response time of a cold cathode tube is about 10 milliseconds, which is shorter than the response time (from tens of milliseconds to hundreds of milliseconds) of the transparent/scattering state switching element. Specifically, the above-mentioned problem can be considered inevitable when the light source and the transparent/scattering state switching element each have different response times. The same problem occurs in any display device provided with a transparent/scattering state switching element that switches the viewing angle by switching the transparent/scattering state.

Figure 1:
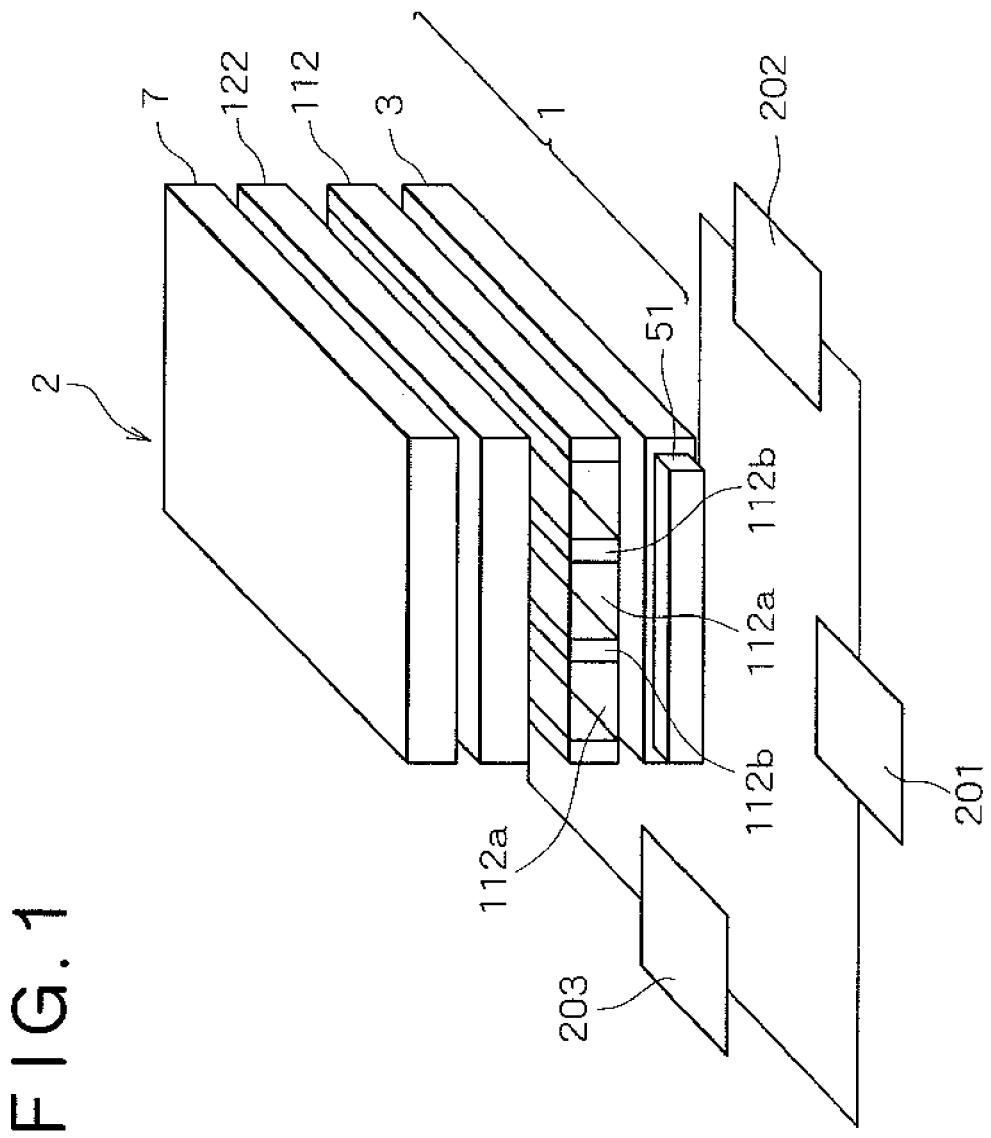
FIG. 1 is a perspective view showing the display device according to a first embodiment of the present invention.

Therefore, in the present invention, a control circuit for controlling the operation of the light source and the transparent/scattering state switching element is provided in the display device in order to overcome the abovementioned problems. The planar light source device, display device, terminal device, and method for driving a planar light source device according to embodiments of the present invention will be described in detail hereinafter with reference to the accompanying drawings. The planar light source device, display device, terminal device, and method for driving a planar light source device according to a first embodiment of the present invention will first be described. FIG. 1 is a perspective view showing the display device according to the present embodiment, FIG. 2 is a sectional view showing the transparent/scattering state switching element that is a constituent element of the display device, and FIG. 3 is a perspective view showing a terminal device in which the display device of the present embodiment is installed.

As shown in FIG. 1, an optical waveguide 3 composed of a transparent material is provided in the display device 2 according to the present first embodiment, and a light source 51 is provided in the position opposite the side surface of the optical waveguide 3. The light source 51 is composed of a plurality of LED, for example, arranged along the side surface of the optical waveguide 3. The light entering from the side surface of the optical waveguide 3 is uniformly emitted from the principal surface (light-emitting surface) of the optical waveguide 3 The light source 51 and optical waveguide 3 constitute a backlight 1 as the light source unit. The backlight 1 emits light in a plane from the light-emitting surface of the optical waveguide 3. A louver 112 that acts as a light-direction regulating element is provided on the side of the light-emitting surface of the optical waveguide 3. In the louver 112, belt-shaped transparent areas 112a for transmitting light, and belt-shaped absorbent areas 112b for absorbing light are arranged in alternating fashion. The direction of this arrangement is parallel to the surface of the louver 112 and is orthogonal to the light-incident surface of the optical waveguide 3, specifically, to the line normal to the surface on the side facing the light source 51. The louver 112 increases the directivity of the light in the arrangement direction when the light emitted from the optical waveguide 3 is transmitted.

A transparent/scattering state switching element 122 is provided on the side of the light-emitting surface of the louver 112 in the display device 2. The transparent/scattering state switching element 122 switches between a state for scattering the light and a state for transmitting the light without scattering when the light entering from the louver 112 is emitted to the opposite side thereof. Furthermore, a transmissive liquid crystal panel 7 is provided on the side of the light-emitting surface of the transparent/scattering state switching element 122. The transmissive liquid crystal panel 7 associates an image with the light by transmitting the light.

Figure 2:
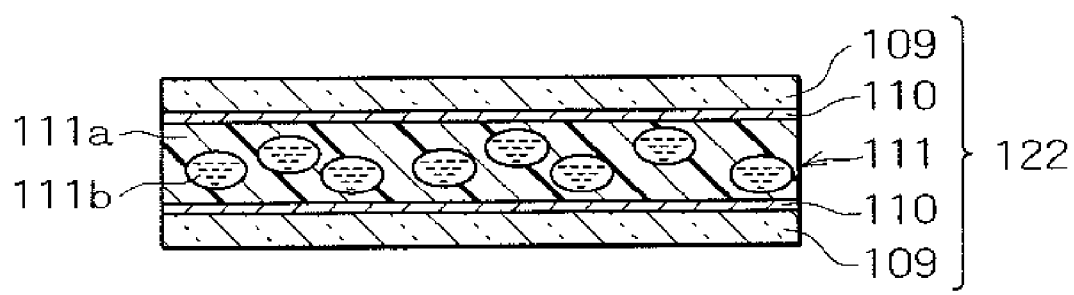
FIG. 2 is a sectional view showing the transparent/scattering state switching element that is a constituent element of the display device.
Figure 3:
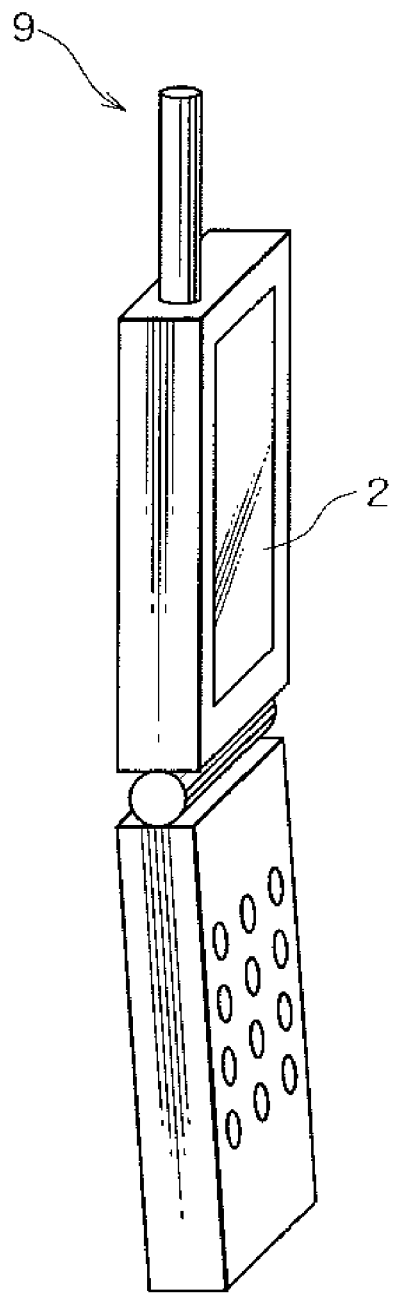
FIG. 3 is a perspective view showing the terminal device according to the present embodiment.

As shown in FIG. 2, a pair of transparent substrates 109 arranged parallel to each other is provided in the transparent/scattering state switching element 122, and electrodes 110 are provided so as to cover the surfaces of the transparent substrates 109 on the surface of each transparent substrate 109 that faces another transparent substrate 109. A PDLC (Polymer Dispersed Liquid Crystal: polymer dispersed liquid crystal) layer 111 is provided between the pair of transparent substrates 109, specifically, between the electrodes 110. Liquid crystal molecules 111b are dispersed in a polymer matrix 111a in the PDLC layer 111. The PDLC layer 111 is formed, for example, by curing a mixture of a photocuring resin and a liquid crystal material by exposure to light.

In the transparent/scattering state switching element 122, the orientation state of the liquid crystal molecules 111b in the PDLC layer 111 is changed by using the pair of electrodes 110 to apply a voltage to the PDLC layer 111. For example, since the apparent refractive index of the polymer matrix differs from that of the liquid crystal molecules when an electric field is not applied to the PDLC layer, a scattering state occurs in which the incident light is scattered and emitted. When an electric field is applied to the PDLC layer, the apparent refractive indices of the polymer matrix and the liquid crystal molecules are substantially the same, and a transparent state occurs in which the incident light is emitted without being scattered. The transparent/scattering state switching element 122 thus scatters or transmits light incident from the louver 112, and emits the light to the transmissive liquid crystal panel 7. A rectangular pulse at 60 Hz is also applied to the transparent/scattering state switching element 122 in order to prevent burn-in.

The display device 2 further has a light source drive circuit 202 that drives the light source 51 and is connected to the light source 51. The light source drive circuit 202 changes the intensity of the light source 51 in conjunction with the transition state of the transparent/scattering state switching element 122, specifically, in synchrony with the change in the haze of the transparent/scattering state switching element 122, when the viewing angle range of the display device 2 is changed. A capacitor (not shown in the drawing) connected in parallel to the LED of the light source 51 is provided, for example, to the light source drive circuit 202. In the light source drive circuit 202, the charging and discharging of the capacitor is utilized to increase the time required for the switching of current.

A transparent/scattering element drive circuit 203 connected to the transparent/scattering state switching element 122 is also provided for driving the transparent/scattering state switching element 122. A control circuit 201 connected to the light source drive circuit 202 and the transparent/scattering element drive circuit 203 is furthermore provided for controlling these components. The control circuit 201 switches between wide-angle display and narrow-angle display by controlling the light source drive circuit 202 and transparent/scattering element drive circuit 203. The control circuit 201, light source drive circuit 202, and transparent/scattering element drive circuit 203 constitute the control unit. The light source 51, optical waveguide 3, louver 112, transparent/scattering state switching element 122, light source drive circuit 202, transparent/scattering element drive circuit 203, and control circuit 201 constitute the planar light source device according to the present embodiment. The display device 2 is also composed of this planar light source device and the transmissive liquid crystal panel 7.

As shown in FIG. 3, this display device 2 is installed in a mobile telephone 9, for example.

The operation of the display device of the present embodiment thus configured, specifically, the method for driving the planar light source device according to the present invention, will next be described. FIGS. 4A through 4E are timing charts showing the state change when the display device of the present embodiment is switched from narrow-angle display to wide-angle display, wherein time is plotted on the horizontal axis of each chart, FIG. 4A has the output voltage of the drive circuit for the transparent/scattering state switching element plotted on the vertical axis, FIG. 4B has the haze (HAZE: haze value) of the transparent/scattering state switching element plotted on the vertical axis, FIG. 4C has the output current of the light source drive circuit plotted on the vertical axis, FIG. 4D has the intensity of the light source plotted on the vertical axis, and FIG. 4E has the frontal luminance of the display device plotted on the vertical axis.

The case of wide-angle display will first be described. When the control circuit 201 receives an instruction for wide-angle display, the light source drive circuit 202 is controlled so as to cause the light source 151 to emit light, and the transparent/scattering element drive circuit 203 is controlled so that the transparent/scattering state switching element 122 is placed in the scattering state. As a result, the light source 51 turns on, and the light emitted from the light source 51 is propagated through the optical waveguide 3 and emitted in a plane from the backlight 1. After the light emitted from the backlight 1 enters the light-direction regulating element 112 and is endowed with increased directivity, the light enters the transparent/scattering state switching element 122. Since the transparent/scattering state switching element 122 is in the scattering state with no voltage applied, the high-directivity light is evenly scattered by the transparent/scattering state switching element 122 and dispersed in a wide range of angles. Specifically, the light whose directivity is increased by the light-direction regulating element 112 is scattered by the transparent/scattering state switching element 122, the directivity of the light is reduced, and the angle of the light is widened. This light that is distributed in an increased range of angles enters the transmissive liquid crystal panel 7, and is emitted without modification as wide-angle light. An image is thus displayed in a wide viewing angle.

The case of narrow-angle display will next be described. When the control circuit 201 receives an instruction for narrow-angle display, the light source drive circuit 202 is controlled so as to cause the light source 51 to emit light, and the transparent/scattering element drive circuit 203 is controlled so that the transparent/scattering state switching element 122 is placed in the transparent state. As a result, the light source 51 turns on, and the light emitted from the light source 151 is propagated through the optical waveguide 3 and emitted in a plane from the backlight 1. The light that is incident on the light-direction regulating element 112 and endowed with increased directivity is then incident on the transparent/scattering state switching element 122. Since the transparent/scattering state switching element 122 is in the transparent state with a voltage applied, the high-directivity light is transmitted without being scattered by the transparent/scattering state switching element 122. Specifically, the light whose directivity is increased by the light-direction regulating element 112 is emitted from the transparent/scattering state switching element 122 while still maintaining its high-directivity distribution. This light in a high-directivity distribution enters the transmissive liquid crystal panel 7, an image is associated with the light, and the light is emitted while still having high directivity. An image is thus displayed in a narrow viewing angle.

A case will next be described in which switching is performed from narrow-angle display to wide-angle display during display operation. In this instance, when the intensity of the light source 51 is the same before and after the transition, the frontal luminance of the wide-angle display decreases in comparison to that of the narrow-angle display, as previously described. However, it is preferable for the main user in the frontal direction to not experience any change in apparent luminance between narrow-angle display and wide-angle display. Therefore, in order to prevent the frontal luminance from decreasing during the switch from narrow-angle display to wide-angle display, the current that flows to the LED constituting the light source 51 is increased, the intensity of the light source 51 is increased, and the frontal luminance is prevented from decreasing. The term "frontal luminance" refers to the luminance in the direction in which the luminance of the light emitted from the backlight 1 and transmitted through the transparent/scattering state switching element 122 is highest during narrow-angle display, specifically, when the transparent/scattering state switching element 122 is in the transparent state.

Figure 4A:
FIGS. 4A through 4E are timing charts showing the state change when the display device of the present embodiment is switched from narrow-angle display to wide-angle display, wherein time is plotted on the horizontal axis of each chart, FIG. 4A has the output voltage of the drive circuit for the transparent/scattering state switching element plotted on the vertical axis, FIG. 4B has the haze (HAZE: haze value) of the transparent/scattering state switching element plotted on the vertical axis, FIG. 4C has the output current of the light source drive circuit plotted on the vertical axis, FIG. 4D has the intensity of the light source plotted on the vertical axis.
Figure 4B:
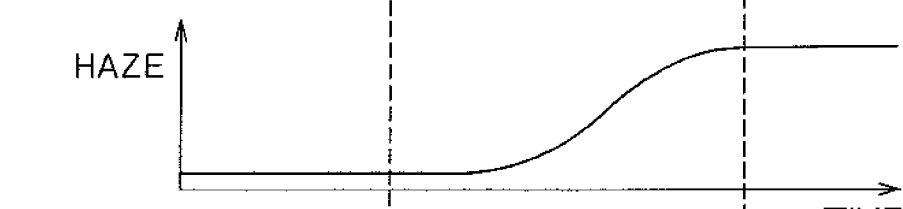

Specifically, at time t1, when the control circuit 201 receives an instruction for switching from narrow-angle display to wide-angle display, the control circuit 201 outputs a control signal to the transparent/scattering element drive circuit 203. The output voltage of the transparent/scattering element drive circuit 203 is thereby switched from ON to OFF as shown in FIG. 4A, and a voltage is no longer applied to the PDLC layer of the transparent/scattering state switching element 122. As a result, a difference occurs in the apparent refractive indices of the polymer matrix and the liquid crystal molecules in the PDLC layer of the transparent/scattering state switching element 122, and the transparent/scattering state switching element 122 is placed in the scattering state. As previously described, the response at this time is slow when the transparent/scattering state switching element 122 is OFF, and it takes tens of milliseconds to hundreds of milliseconds until the haze of the transparent/scattering state switching element 122 increases to saturation. Therefore, the haze of the transparent/scattering state switching element 122 gradually increases over the period from time t1 to time t2, and stabilizes at time t2, as shown in FIG. 4B.

Figure 4C:
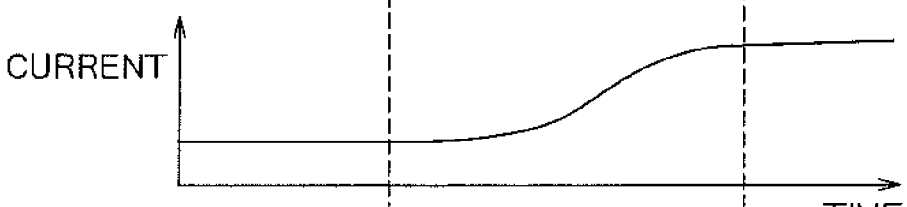
Figure 4D:
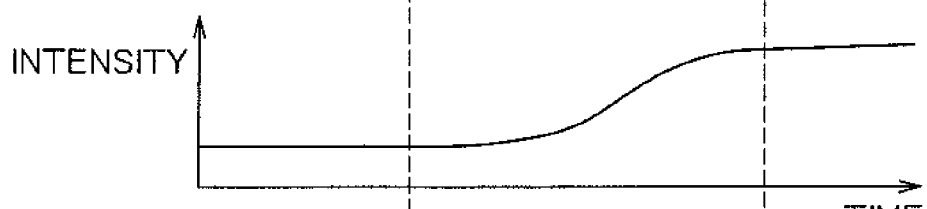

The control circuit 201 also sends a control signal to the light source drive circuit 202 and increases the intensity of the light source 51 at time t1. The light source drive circuit 202 controls the light source 51 at this time so that the intensity of the light source 51 gradually increases in conjunction with the change in the haze of the transparent/scattering state switching element 122. As shown in FIG. 4C, the current outputted to the light source 51 by the light source drive circuit 202 is thereby gradually increased over the period from time t1 to time t2. Consequently, the intensity of the light source 51 is also gradually increased over the period from time t1 to time t2 in synchrony with the change in the haze of the transparent/scattering state switching element 122, as shown in FIG. 4D.

Figure 4E:
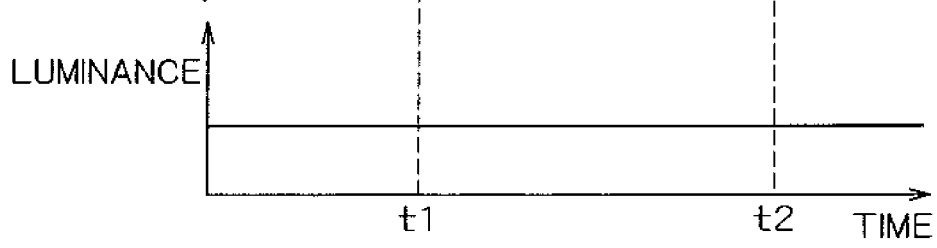

As a result, the intensity of the light source 51 is increased in conjunction with the transition of the transparent/scattering state switching element 122 from the transparent state to the scattering state, and with the widening of the radiation angle of the radiated light. Therefore, the frontal luminance of the display device 2 remains unchanged, as shown in FIG. 4E. Abnormal flashing can thereby be prevented from occurring during the period between time t1 and time t2.

A case was described above in which the display device 2 was switched from narrow-angle display to wide-angle display, but the same principles can be applied in the case of switching from wide-angle display to narrow-angle display. FIGS. 5A through 5E are timing charts showing the state change when the display device of a comparative example is switched from wide-angle display to narrow-angle display, wherein time is plotted on the horizontal axis of each chart, FIG. 5A has the output voltage of the drive circuit for the transparent/scattering state switching element plotted on the vertical axis, FIG. 5B has the haze of the transparent/scattering state switching element plotted on the vertical axis, FIG.

Figure 5A:
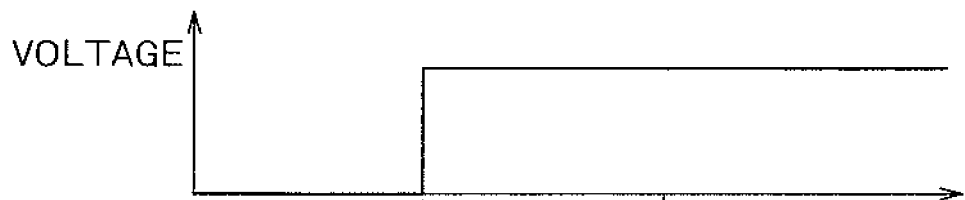
FIGS. 5A through 5E are timing charts showing the state change when the display device of a comparative example is switched from wide-angle display to narrow-angle display, wherein time is plotted on the horizontal axis of each chart, FIG. 5A has the output voltage of the drive circuit for the transparent/scattering state switching element plotted on the vertical axis, FIG. 5B has the haze of the transparent/scattering state switching element plotted on the vertical axis, FIG. 5C has the output current of the light source drive circuit plotted on the vertical axis, FIG. 5D has the intensity of the light source plotted on the vertical axis, and FIG. 5E has the frontal luminance of the display device plotted on the vertical axis.
Figure 5B:
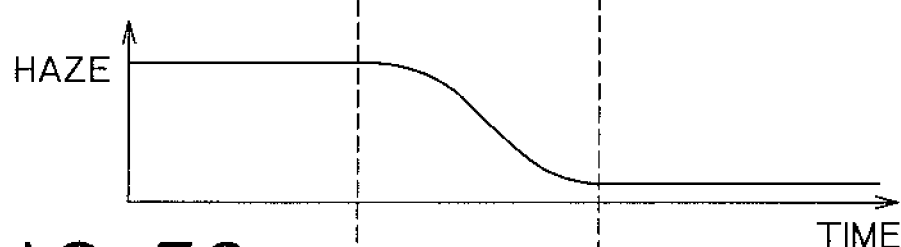
Figure 5C:
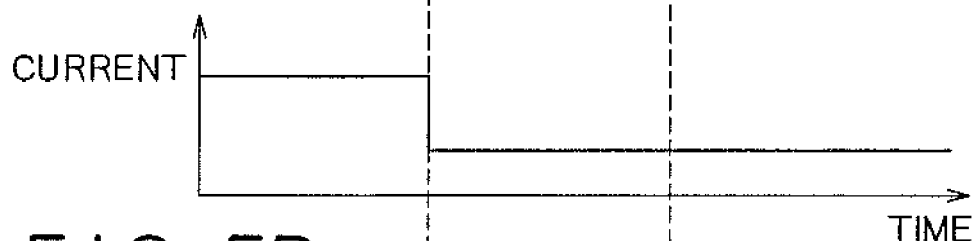
Figure 5D:
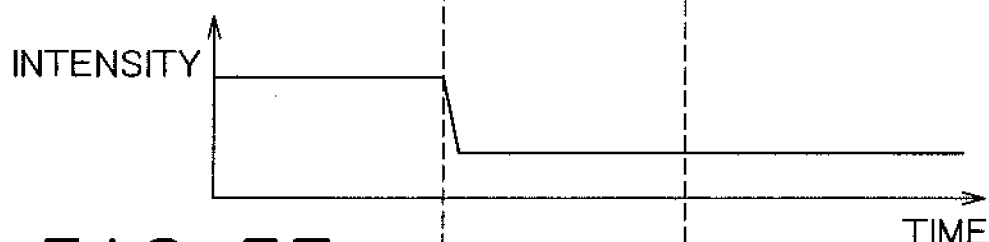
Figure 5E:
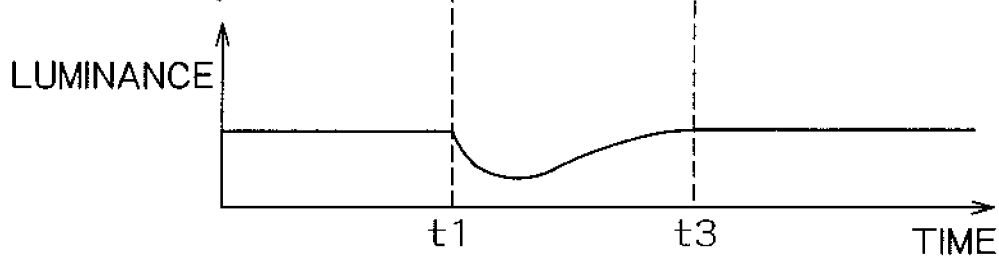

5C has the output current of the light source drive circuit plotted on the vertical axis, FIG. 5D has the intensity of the light source plotted on the vertical axis, and FIG. 5E has the frontal luminance of the display device plotted on the vertical axis. FIGS. 6A through 6E are timing charts showing the state change when the display device of the present embodiment is switched from wide-angle display to narrow-angle display, wherein time is plotted on the horizontal axis of each chart, FIG. 6A has the output voltage of the drive circuit for the transparent/scattering state switching element plotted on the vertical axis, FIG. 6B has the haze of the transparent/scattering state switching element plotted on the vertical axis, FIG. 6C has the output current of the light source drive circuit plotted on the vertical axis, FIG. 6D has the intensity of the light source plotted on the vertical axis, and FIG. 6E has the frontal luminance of the display device plotted on the vertical axis.

The operation (hereinafter referred to as the "wide-to-narrow angle switch") for switching from wide-angle display to narrow-angle display in the display device will be described hereinafter. The operation of the display device according to a comparative example shown in FIG. 18 will first be described. During the wide-to-narrow angle switch, when the intensity of the light source is the same before and after the switch, the frontal luminance increases during the switch. Therefore during the wide-to-narrow angle switch, the current flowing to the LED constituting the light source 51 is reduced, the intensity of the light source is reduced, and the frontal luminance is prevented from increasing.

Specifically, at time t1, the control circuit 3201 (see FIG. 18) receives an instruction for switching from wide-angle display to narrow-angle display, whereupon the control circuit 3201 outputs a control signal to the transparent/scattering state switching element drive circuit. The output voltage of the drive circuit for the transparent/scattering state switching element is thereby switched from OFF to ON, and a voltage is applied to the PDLC layer of the transparent/scattering state switching element, as shown in FIG. 5A. As a result, the apparent refractive indices of the polymer matrix and the liquid crystal molecules become substantially the same in the PDLC layer of the transparent/scattering state switching element, and the transparent/scattering state switching element is placed in the transparent state. It takes a certain amount of time, however, for the haze of the transparent/scattering state switching element to decrease and stabilize. The haze of the transparent/scattering state switching element therefore gradually decreases over the period from time t1 to time t3 and stabilizes at time t3, as shown in FIG. 5B.

The control circuit 3201 sends a control signal to the light source drive circuit at time t1. The current outputted by the light source drive circuit to the light source is thereby instantly reduced at time t1, as shown in FIG. 5C. Consequently, the intensity of the light source also decreases virtually instantaneously at time t1.

As a result, a state occurs in which the intensity of the light source is low, and the transparent/scattering state switching element does not become completely transparent during the period from time t1 to time t3. The low-intensity light of the light source is therefore scattered, and the frontal luminance decreases. Consequently, a user positioned in front of the display device may notice a brief darkening of the screen.

Figure 6A:
FIGS. 6A through 6E are timing charts showing the state change when the display device of the present embodiment is switched from wide-angle display to narrow-angle display, wherein time is plotted on the horizontal axis of each chart, FIG. 6A has the output voltage of the drive circuit for the transparent/scattering state switching element plotted on the vertical axis, FIG. 6B has the haze of the transparent/scattering state switching element plotted on the vertical axis, FIG. 6C has the output current of the light source drive circuit plotted on the vertical axis, FIG. 6D has the intensity of the light source plotted on the vertical axis, and FIG. 6E has the frontal luminance of the display device plotted on the vertical axis.
Figure 6B:
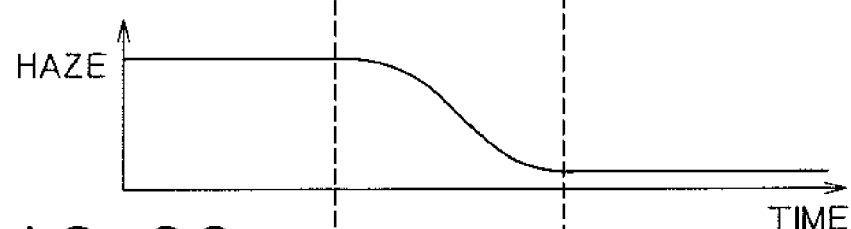
Figure 6C:
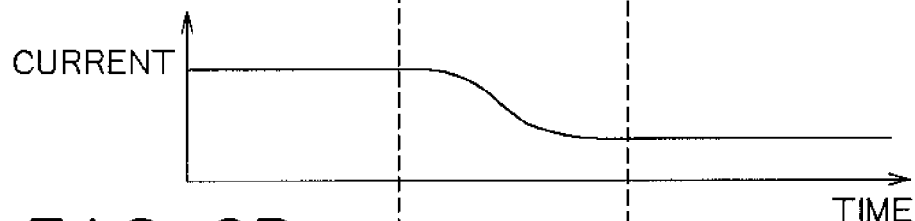
Figure 6D:
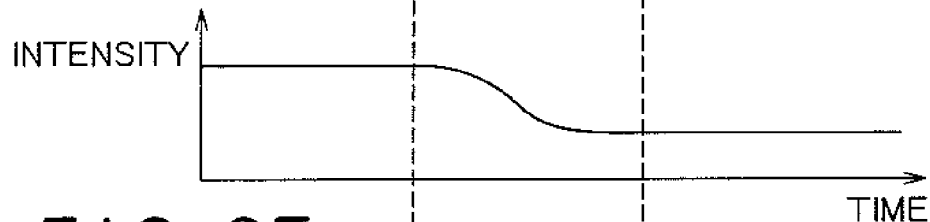

In contrast, in the present embodiment, the control circuit 201 (see FIG. 1) receives the instruction for a wide-to-narrow angle switch at time t1, whereupon a control signal is set to the light source drive circuit 202, and the intensity of the light source 51 is reduced. The light source drive circuit 202 controls the light source 51 at this time so that the intensity of the light source 51 gradually decreases in conjunction with the change in the haze of the transparent/scattering state switching element 122. As shown in FIG. 6C, the current outputted to the light source 51 by the light source drive circuit 202 is thereby gradually reduced over the period from time t1 to time t3. Consequently, the intensity of the light source 51 is also gradually reduced over the period from time t1 to time t3 in synchrony with the change in the haze of the transparent/scattering state switching element 122, as shown in FIG. 6D.

Figure 6E:
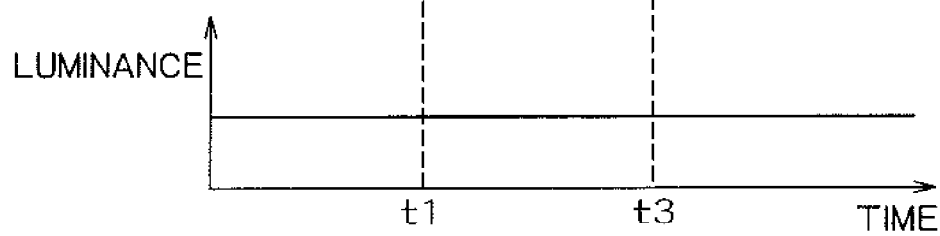

As a result, the intensity of the light source 51 decreases in conjunction with the transition of the transparent/scattering state switching element 122 from the scattering state to the transparent state, and with the narrowing of the radiation angle of the radiated light. Therefore, the frontal luminance of the display device 2 remains unchanged, as shown in FIG. 6E. The screen can thereby be prevented from darkening during the period from time t1 to time t3.

According to the present embodiment, abnormal flashing can be prevented from occurring when the display is switched from narrow-angle display to wide-angle display in the display device 2. The frontal luminance can also be prevented from decreasing when the display is switched from wide-angle display to narrow-angle display. A specific feature of the present embodiment is that during both narrow-to-wide angle switching and wide-to-narrow angle switching, the frontal luminance during the switching period (during the transition period) does not increase above the frontal luminance during the periods before and after the switching period. There is therefore no discomfort caused for the user in front of the display device.

In the present embodiment, an example was described in which the intensity of the light source is gradually changed in conjunction with the change in the haze of the transparent/scattering state switching element both during narrow-to-wide angle switching and wide-to-narrow angle switching. However, even in the conventional display device, there is only a momentary decrease in frontal luminance during wide-to-narrow angle switching, which would be difficult for a user to distinguish from the abnormal flashing that occurs during narrow-to-wide angle switching. The response time of the transparent/scattering state switching element when the voltage is switched from OFF to ON is also shorter than the response time when the voltage is switched from ON to OFF. Therefore, the period in which the frontal luminance decreases, that is, the period from time t1 to time t3, is shorter than the period during which abnormal flashing occurs, which is the period from time t1 to time t2. The degree of discomfort imparted to the user by the decrease in frontal luminance during wide-to-narrow angle switching is therefore small compared to the discomfort imparted by abnormal flashing during narrow-to-wide angle switching. Therefore, in the present invention, discomfort can be significantly reduced merely by performing the aforementioned control during narrow-to-wide angle switching.

An example was described in the present embodiment in which the planar light source device of the display device is provided with a light-direction regulating element. However, it is sufficient for the planar light source device to be provided with at least a light source, an optical waveguide, a transparent/scattering state switching element, a display panel, a light source drive circuit for driving the light source, and a transparent/scattering element drive circuit for driving the transparent/scattering state switching element; and the light-direction regulating element may be omitted. However, by providing a light-direction regulating element, it is possible to increase the directivity of the light emitted from the backlight composed of the light source and optical waveguide, and to enhance the ability to prevent eavesdropping during narrow-angle display.

Furthermore, in the present embodiment, an example was described in which the arrangement direction of the transparent areas and absorbent areas with respect to each other in the louver as the light-direction regulating element is the direction orthogonal to the line normal to the light-incident surface of the optical waveguide. However, the present invention is not limited to this configuration, and a rotating arrangement in the light-emitting surface of the optical waveguide may also be adopted, for example. By this configuration, the moiré created by the louver and the display panel can be made less noticeable, and the display quality can be enhanced.

The transparent/scattering state switching element is also not limited to having a PDLC layer, and any element capable of switching between a transparent state and a scattering state may be used. Examples thereof may include an element that uses a polymer network liquid crystal (PNLC), or an element that uses dynamic scattering (DS). In the present embodiment, a PDLC layer is used that is in the scattering state when a voltage is not applied, and in the transparent state when a voltage is applied. By this configuration, the intensity of the light source during the scattering state can be enhanced without increasing the battery capacity, since the transparent/scattering state switching element no longer consumes power when in the scattering state, and the power that would have been consumed can be allocated to the light source. It is also possible to use a PDLC layer that is in the transparent state when a voltage is not being applied, and in the scattering state when a voltage is applied. This type of PDLC layer is fabricated by exposing a polymer matrix to light and curing the polymer matrix while applying a voltage. By this configuration, there is no need for applying a voltage to the PDLC layer, and power consumption can be suppressed in a mobile information terminal in which narrow-angle display is frequently used.

Cholesteric liquid crystal, ferroelectric liquid crystal, or the like may also be used as the liquid crystal molecules used in the PDLC layer. Even when voltage is no longer applied, these liquid crystals retain the orientation they had when the voltage was applied, and have memory properties. By using this type of PDLC layer, it becomes possible to reduce power consumption. The terminals connected to the two flat electrodes 110 sandwiching the PDLC layer 111 may also be short-circuited when the transparent/scattering state switching element is OFF. When the terminals connected to the electrodes 110 are opened during this OFF state, the charge accumulated in the electrodes 110 is maintained, and the response of the transparent/scattering state switching element becomes extremely slow. In contrast, by short-circuiting the terminals during the OFF state, a charge is not maintained in the electrodes 110, and the response of the transparent/scattering state switching element can therefore be made faster.

In the display device according to the present embodiment, the light source was described as being composed of a plurality of LEDs disposed on the light-incident surface of the optical waveguide, but the present invention is not limited by this configuration. For example, a cold cathode tube or an EL backlight that utilizes electroluminescence may be used. However, it becomes possible to reduce the thickness of the light source when an LED is used. When the light source is composed of a white LED, and the white LED is composed of a blue LED and a yellow phosphor, the intensity of the white LED may be adjusted by pulse width modulation of the current. In a white LED composed of a blue LED and a yellow phosphor, the yellow phosphor is excited by a portion of the blue light emitted by the blue LED, and yellow light is emitted. The blue light and the yellow light mix together to generate white light. The emission ratio of the blue light and yellow light fluctuates when the amount of current is adjusted so that the frontal luminance of the transmissive liquid crystal panel in the case of narrow-angle display has the same value as in the case of wide-angle display. Variation therefore occurs in the chroma of the transmissive liquid crystal panel. In contrast, when the light intensity is adjusted by pulse modulation, adjustment of the light intensity is achieved by adjusting the ratio of the emission time, allowing variation in the chroma of the transmissive liquid crystal panel to be minimized.

Furthermore, an example was described in the present embodiment in which a capacitor is provided to the light source drive circuit. However, the present invention is not limited to this configuration, and the light source drive circuit may be configured so as to be capable of delaying the switching timing of the current driving the light source with respect to the switch between narrow-angle display and wide-angle display. For example, a circuit may be suitable for use that is provided with a DA converter and is capable of sequentially designating and outputting a current between the ON and OFF states. By this configuration, the current during the ON state and the OFF state can be more appropriately set in conjunction with the response of the transparent/scattering state switching element during the ON state and the OFF state, respectively.

The display panel used in combination with the planar light source device in the present invention is not limited to a liquid crystal panel, and any display panel that uses a light source device may be used. The liquid crystal panel is also not limited to the transmissive type, and any panel that has a transmissive area in each pixel may be used. A transflective liquid crystal panel having a reflective area in a portion of each pixel, a visible-everywhere transflective liquid crystal panel, or a micro-reflective liquid crystal panel may also be used. A liquid crystal panel is preferred that has minimal dependence on the viewing angle. Contrast inversion during display at a wide viewing angle can thereby be suppressed. Examples of the mode of such a liquid crystal panel include IPS (In-Plane Switching), FFS (Fringe Field Switching), AFFS (Advanced Fringe Field Switching), and the like among horizontal field modes. Vertical alignment modes include MVA (Multi-domain Vertical Alignment), which is multi-domain and possesses reduced viewing-angle dependency, as well as PVA (Patterned Vertical Alignment), ASV (Advanced Super V), and the like. Furthermore, a film-compensated TN liquid crystal display panel may also be appropriately used.

The display device of the present embodiment may be suitably installed in a mobile telephone or other mobile terminal device. Compatible mobile terminal devices include not only mobile telephones, but also PDAs (Personal Digital Assistant: personal information terminal), gaming devices, digital cameras, digital video cameras, and various other types of mobile terminal devices. The display device may be installed not only in mobile terminal devices, but also in notebook-type personal computers, cash dispensers, vending machines, and other various types of terminal devices.

The planar light source device, display device, terminal device, and method for driving a planar light source device according to a second embodiment of the present invention will next be described. The display device according to the present embodiment differs from the display device according to the previously described first embodiment in that the light source drive circuit 202 (see FIG. 1) switches the output current with respect to the light source after the transition from the transparent state to the scattering state is completed in the transparent/scattering state switching element 122. In the present embodiment, a delay circuit (not shown in the drawing) is provided inside the control circuit 201, for example, and when the instruction for narrow-to-wide angle switching is received, the timing for controlling the light source drive circuit is delayed with respect to the timing for controlling the drive circuit for the transparent/scattering state switching element. Other aspects of the present embodiment are the same as those of the aforementioned first embodiment.

The operation of the display device according to the present embodiment thus configured, specifically, the method for driving the planar light source device according to the present embodiment, will next be described. FIGS. 7A through 7E are timing charts showing the state change when the display device according to the present embodiment is switched from narrow-angle display to wide-angle display, wherein time is plotted on the horizontal axis of each chart, FIG. 7A has the output voltage of the drive circuit for the transparent/scattering state switching element plotted on the vertical axis, FIG. 7B has the haze of the transparent/scattering state switching element plotted on the vertical axis, FIG. 7C has the output current of the light source drive circuit plotted on the vertical axis, FIG. 7D has the intensity of the light source plotted on the vertical axis, and FIG. 7E has the frontal luminance of the display device plotted on the vertical axis.

Figure 7A:
FIGS. 7A through 7E are timing charts showing the state change when the display device according to the first embodiment of the present invention is switched from narrow-angle display to wide-angle display, wherein time is plotted on the horizontal axis of each chart, FIG. 7A has the output voltage of the drive circuit for the transparent/scattering state switching element plotted on the vertical axis, FIG. 7B has the haze of the transparent/scattering state switching element plotted on the vertical axis, FIG. 7C has the output current of the light source drive circuit plotted on the vertical axis, FIG. 7D has the intensity of the light source plotted on the vertical axis, and FIG. 7E has the frontal luminance of the display device plotted on the vertical axis.
Figure 7B:
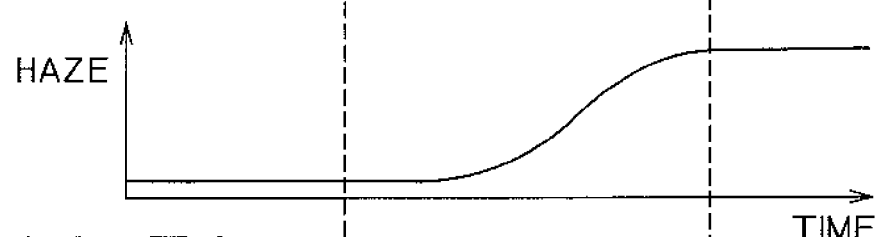
Figure 7C:
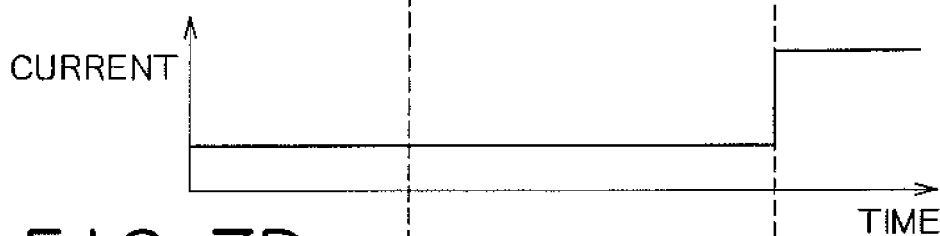
Figure 7D:
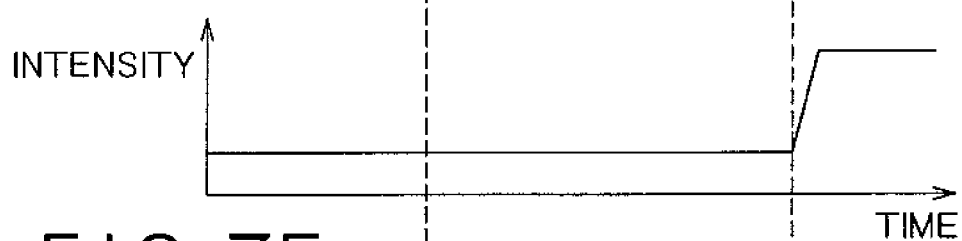

As shown in FIGS. 7A and 7B, the operation of the transparent/scattering state switching element drive circuit and the transparent/scattering state switching element during narrow-to-wide angle switching is the same as in the first embodiment. As shown in FIGS. 7B and 7C, the control circuit 201 in the present embodiment does not change the intensity of the light source 51 until the change of the transparent/scattering state switching element 122 to the scattering state is adequately completed. Specifically, the control circuit 201 does not present a switching instruction to the light source drive circuit 202 at time t1, so that the intensity of the light source 51 becomes the same as in the narrow-angle display state. The instruction for switching to the wide-angle display state is then presented to the light source drive circuit 202 at time t2 at the stage when the change of the transparent/scattering state switching element 122 to the scattering state is adequately completed, specifically, at the stage when the transition of the transparent/scattering state switching element 122 is completed. The output current of the light source drive circuit 202 is thereby increased as shown in FIG. 7C, and the intensity of the light source increases as shown in FIG. 7D.

As a result, the frontal luminance decreases as the haze of the transparent/scattering state switching element 122 increases since the intensity of the light source 51 is at the low level that corresponds to the narrow-angle display state during transitional period when the transparent/scattering state switching element 122 changes to the scattering state, specifically, in the period from time t1 to time t2. After the change of the transparent/scattering state switching element 122 to the scattering state is completed, the current flowing to the light source 51 is increased, and the intensity is increased to produce a frontal luminance that is equivalent to the frontal luminance during narrow-angle display. Therefore, since the frontal luminance is temporarily reduced during narrow-to-wide angle switching in the present embodiment, abnormal flashing does not occur.

As previously described, abnormal flashing is prevented from occurring in the present embodiment by not increasing the intensity of the light source until the haze of the transparent/scattering state switching element has finished changing during narrow-to-wide angle switching. As a result, the frontal luminance temporarily decreases during narrow-to-wide angle switching, but the decrease in frontal luminance does not cause as much discomfort to the user as abnormal flashing. Discomfort during switching is therefore significantly reduced by the present embodiment. In the present embodiment, it is also sufficient if the output current of the light source drive circuit is increased after the haze change of the transparent/scattering state switching element is completed, and there is no need to gradually reduce the output current of the light source drive circuit in conjunction with the haze change of the transparent/scattering state switching element, as in the first embodiment. Abnormal flashing can therefore be suppressed by a simple method of timing adjustment.

A configuration was adopted in the present embodiment in which the output current of the light source drive circuit is increased after the haze change of the transparent/scattering state switching element is completed. However, the increase in the output current of the light source drive circuit is not limited to being performed after the haze change is fully completed, and may be performed during the haze change as long as the same effects are produced. Certain effects may be obtained when the output current of the light source drive circuit is increased after the beginning of the transition from the transparent state to the scattering state in the transparent/scattering state switching element.

During wide-to-narrow angle switching, since abnormal flashing occurs in the display screen when control of the light source drive circuit is delayed with respect to control of the transparent/scattering state switching element drive circuit, it is preferred that the delay circuit either be deactivated, or that control of the transparent/scattering state switching element drive circuit be delayed with respect to control of the light source drive circuit. FIGS. 8A through 8E are timing charts showing the state change when the output current of the light source drive circuit is switched after the output voltage of the transparent/scattering state switching element drive circuit have been switched in a wide-to-narrow angle switch, wherein time is plotted on the horizontal axis of each chart, FIG. 8A has the output voltage of the drive circuit for the transparent/scattering state switching element plotted on the vertical axis, FIG. 8B has the haze of the transparent/scattering state switching element plotted on the vertical axis, FIG. 8C has the output current of the light source drive circuit plotted on the vertical axis, FIG. 8D has the intensity of the light source plotted on the vertical axis, and FIG. 8E has the frontal luminance of the display device plotted on the vertical axis. FIGS. 9A through 9E are timing charts showing the state change when the output current of the light source drive circuit is switched simultaneously with switching of the output voltage of the transparent/scattering state switching element drive circuit in a wide-to-narrow angle switch, wherein time is plotted on the horizontal axis of each chart, FIG. 9A has the output voltage of the drive circuit for the transparent/scattering state switching element plotted on the vertical axis, FIG. 9B has the haze of the transparent/scattering state switching element plotted on the vertical axis, FIG. 9C has the output current of the light source drive circuit plotted on the vertical axis, FIG. 9D has the intensity of the light source plotted on the vertical axis, and FIG. 9E has the frontal luminance of the display device plotted on the vertical axis.

Figure 8A:
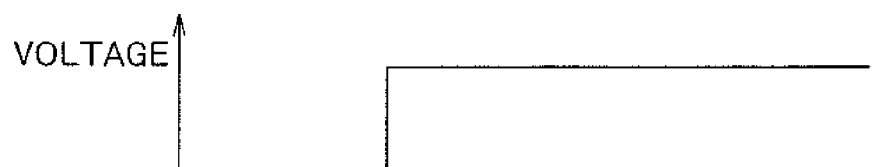
FIGS. 8A through 8E are timing charts showing the state change when the output current of the light source drive circuit is switched after the output voltage of the transparent/scattering state switching element drive circuit have been switched in a wide-to-narrow-angle switch, wherein time is plotted on the horizontal axis of each chart, FIG. 8A has the output voltage of the drive circuit for the transparent/scattering state switching element plotted on the vertical axis, FIG. 8B has the haze of the transparent/scattering state switching element plotted on the vertical axis, FIG. 8C has the output current of the light source drive circuit plotted on the vertical axis, FIG. 8D has the intensity of the light source plotted on the vertical axis, and FIG. 8E has the frontal luminance of the display device plotted on the vertical axis.
Figure 8B:
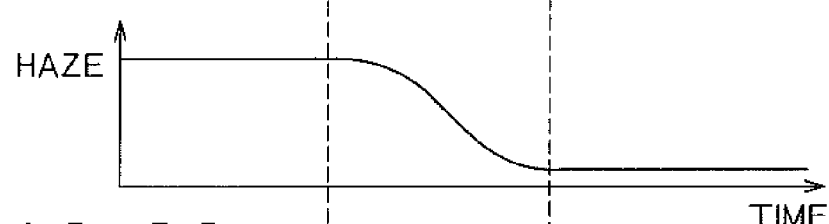
Figure 9A:
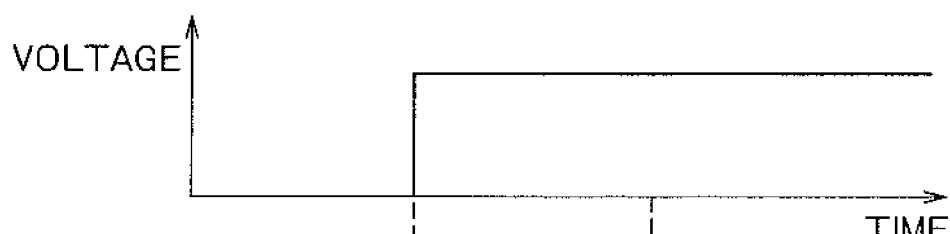
FIGS. 9A through 9E are timing charts showing the state change when the output current of the light source drive circuit is switched simultaneously with switching of the output voltage of the transparent/scattering state switching element drive circuit in a wide-to-narrow angle switch, wherein time is plotted on the horizontal axis of each chart, FIG. 9A has the output voltage of the drive circuit for the transparent/scattering state switching element plotted on the vertical axis.
Figure 9B:
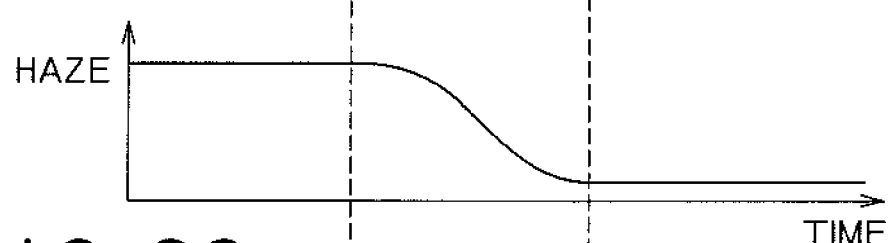

As shown in FIGS. 8A and 9A, when the control circuit 201 of a display device that is in the wide-angle display state receives an instruction at time t1 for switching to narrow-angle display, the transparent/scattering element drive circuit 203 is controlled so that the transparent/scattering state switching element 122 is placed in the transparent state. Specifically, the output voltage of the transparent/scattering element drive circuit 203 is switched on. The haze of the transparent/scattering state switching element 122 thereby starts to decrease, as shown in FIGS. 8B and 9B. The response of the transparent/scattering state switching element 122 is slower than the response of the light source, and a relatively long time is required until the haze decreases and becomes saturated. Therefore, the haze of the transparent/scattering state switching element 122 gradually decreases over the period from time t1 to time t2, and stabilizes at time t2.

Figure 7E:
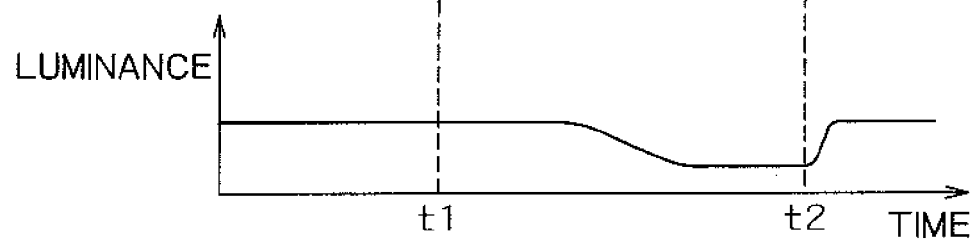
Figure 8C:
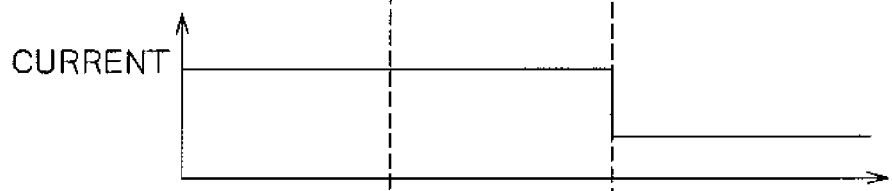
Figure 8D:
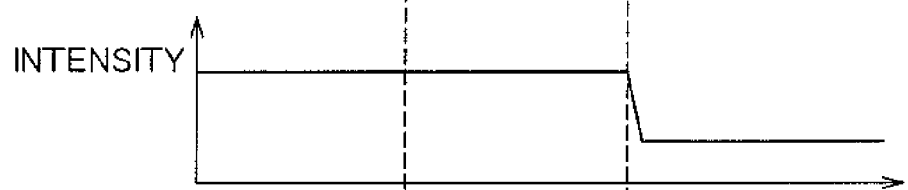
Figure 8E:
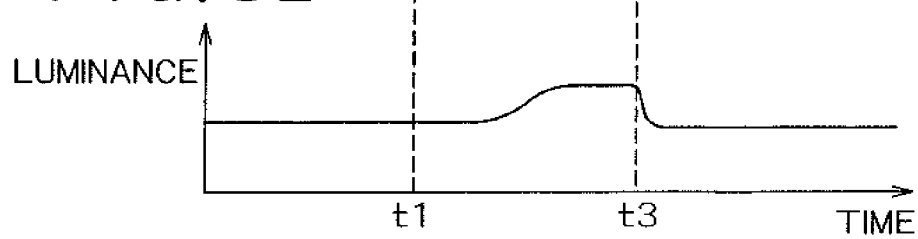

As shown in FIGS. 8C and 8D, when the intensity of the light source 51 at this time is not reduced by the time the change of the transparent/scattering state switching element 122 to the transparent state is adequately completed, the frontal luminance temporarily increases as shown in FIG. 7E since the transparent/scattering state switching element 122 changes to the transparent state regardless of the fact that the light source 51 is emitting light at high intensity for wide-angle display. After the transparent state becomes stable in the transparent/scattering state switching element 122, the frontal luminance becomes about the same as it was during wide-angle display if the intensity of the light source is then reduced. However, the temporary increase in luminance that occurs in the meantime is recognized as abnormal flashing of the display screen.

Figure 9C:
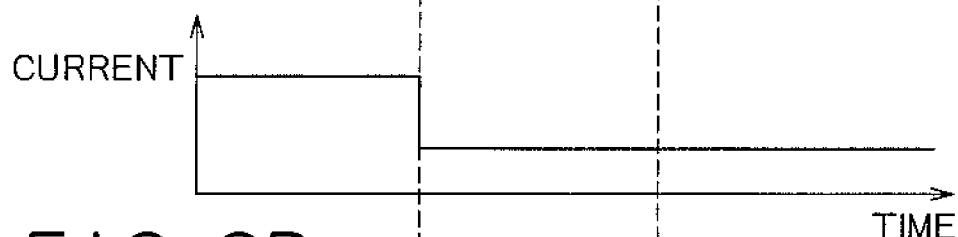
Figure 9D:
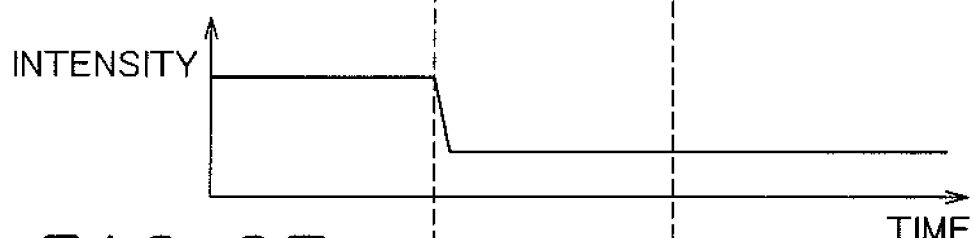
Figure 9E:
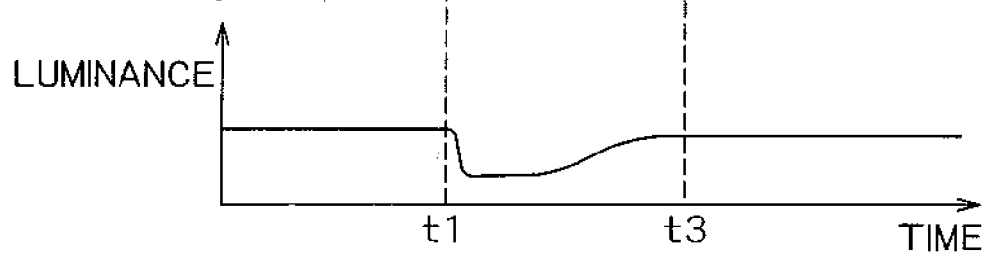

In contrast, as shown in FIGS. 9C and 9D, the intensity of the light source decreases before the start of the haze reduction of the transparent/scattering state switching element if the output current of the light source drive circuit 202 is reduced at the same time that the output voltage of the transparent/scattering element drive circuit 203 is switched. Therefore, as shown in FIG. 9E, the low-intensity light used for narrow-angle display is scattered in a wide range of angles, and the frontal luminance decreases since the haze of the transparent/scattering state switching element 122 still has a large value immediately after the intensity of the light source decreases. Then, when the haze of the transparent/scattering state switching element 122 decreases and the transparent state occurs, the luminance in the frontal direction is restored to maintain a frontal luminance that is equivalent to that of the wide-angle display state. By this configuration, abnormal flashing in the display screen can be suppressed during switching from wide-angle display to narrow-angle display.

The planar light source device, display device, terminal device, and method for driving a planar light source device according to a third embodiment of the present invention will next be described. In the present embodiment, the output current of the light source drive circuit 202 is turned off, and the light source 51 is not activated during the period in which the haze of the transparent/scattering state switching element 122 is changing. Other aspects of the present embodiment are the same as those of the aforementioned first embodiment.

The operation of the display device according to the present embodiment thus configured, specifically, the method for driving the planar light source device according to the present embodiment, will next be described. FIGS. 10A through 10E are timing charts showing the state change when the display device according to the third embodiment of the present invention is switched from narrow-angle display to wide-angle display, wherein time is plotted on the horizontal axis of each chart, FIG. 10A has the output voltage of the drive circuit for the transparent/scattering state switching element plotted on the vertical axis, FIG. 10B has the haze of the transparent/scattering state switching element plotted on the vertical axis, FIG. 10C has the output current of the light source drive circuit plotted on the vertical axis, FIG. 10D has the intensity of the light source plotted on the vertical axis, and FIG. 10E has the frontal luminance of the display device plotted on the vertical axis.

Figure 10A:
FIGS. 10A through 10E are timing charts showing the state change when the display device according to the third embodiment of the present invention is switched from narrow-angle display to wide-angle display, wherein time is plotted on the horizontal axis of each chart, FIG. 10A has the output voltage of the drive circuit for the transparent/scattering state switching element plotted on the vertical axis, FIG. 10B has the haze of the transparent/scattering state switching element plotted on the vertical axis, FIG. 10C has the output current of the light source drive circuit plotted on the vertical axis, FIG. 10D has the intensity of the light source plotted on the vertical axis, and FIG. 10E has the frontal luminance of the display device plotted on the vertical axis.
Figure 10B:
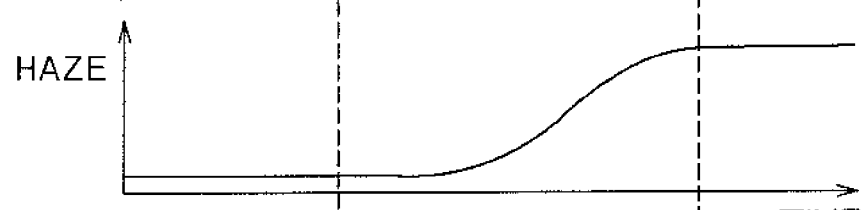
Figure 10C:
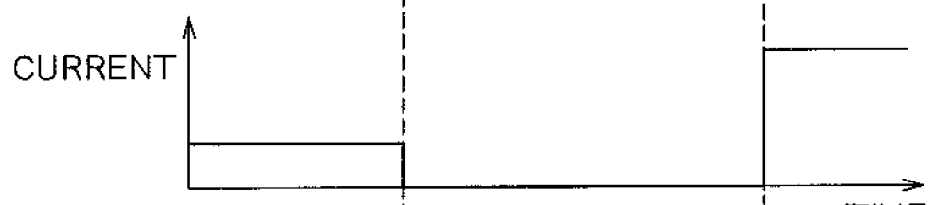
Figure 10D:
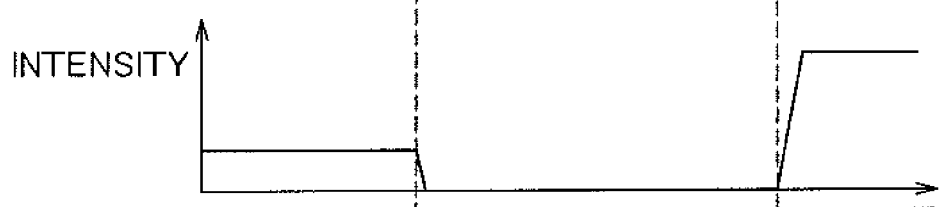

When the display device is in the narrow-angle display state, the control circuit 201 receives the instruction for switching to wide-angle display, whereupon the transparent/scattering element drive circuit 203 is controlled so that the transparent/scattering state switching element 122 is placed in the scattering state, as shown in FIG. 10A. Specifically, the output voltage of the transparent/scattering element drive circuit 203 is turned off, and the haze of the transparent/scattering state switching element 122 is increased as shown in FIG. 10B. At the same time, the control circuit 201 controls the light source drive circuit 202 and turns off the output current to the light source 51, as shown in FIG. 10C. The LED constituting the light source 51 is thereby turned off, as shown in FIG. 10D. As previously mentioned, the response of the transparent/scattering state switching element 122 in the OFF state is slower than the response of the light source, and a relatively long time is required until the haze increases and becomes saturated after the voltage is no longer applied. However, since the light source is turned off during this period, the frontal luminance of the display screen is still zero, and the display screen is unaffected by the mid-transition state of the transparent/scattering state switching element 122.

Figure 10E:
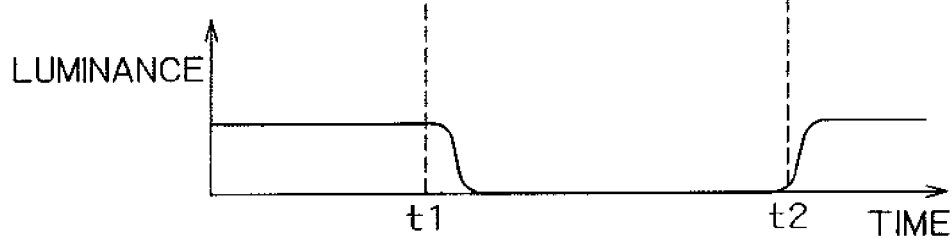

An instruction for switching to the wide-angle display state is then presented to the light source drive circuit 202 at the stage in which the change to the scattering state by the transparent/scattering state switching element 122 is adequately completed, the output current of the light source drive circuit 202 is increased, and the LED is turned on, as shown in FIG. 10D. As a result, the frontal luminance is still zero, and abnormal flashing in which the luminance of the display screen suddenly increases for a brief period can be suppressed since the light source 51 is turned on during the transition period in which the transparent/scattering state switching element 122 changes to the scattering state as shown in FIG. 10E.

A case of switching from narrow-angle display to wide-angle display was described above, but the present embodiment may be applied in exactly the same manner to a case of switching from a state of wide-angle display to a state of narrow-angle display. FIGS. 11A through 11E are timing charts showing the state change when the display device according to the present embodiment is switched from wide-angle display to narrow-angle display, wherein time is plotted on the horizontal axis of each chart, FIG. 11A has the output voltage of the drive circuit for the transparent/scattering state switching element plotted on the vertical axis, FIG. 11B has the haze of the transparent/scattering state switching element plotted on the vertical axis, FIG. 11C has the output current of the light source drive circuit plotted on the vertical axis, FIG. 11D has the intensity of the light source plotted on the vertical axis, and FIG. 11E has the frontal luminance of the display device plotted on the vertical axis. In the same manner as during the previously described narrow-to-wide angle switching, the output current of the light source drive circuit 202 in the present embodiment is turned OFF during wide-to-narrow angle switching, and the light source is not turned on during the transition period in which the haze of the transparent/scattering state switching element 122 is changing.

Figure 11A:
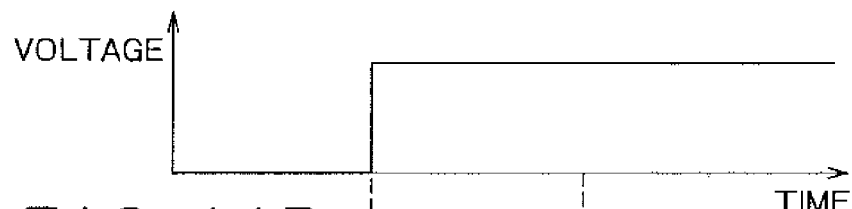
FIGS. 11A through 11E are timing charts showing the state change when the display device according to the present embodiment is switched from wide-angle display to narrow-angle display, wherein time is plotted on the horizontal axis of each chart, FIG. 11A has the output voltage of the drive circuit for the transparent/scattering state switching element plotted on the vertical axis, FIG. 11B has the haze of the transparent/scattering state switching element plotted on the vertical axis, FIG. 11C has the output current of the light source drive circuit plotted on the vertical axis, FIG. 11D has the intensity of the light source plotted on the vertical axis, and FIG. 11E has the frontal luminance of the display device plotted on the vertical axis.
Figure 11B:
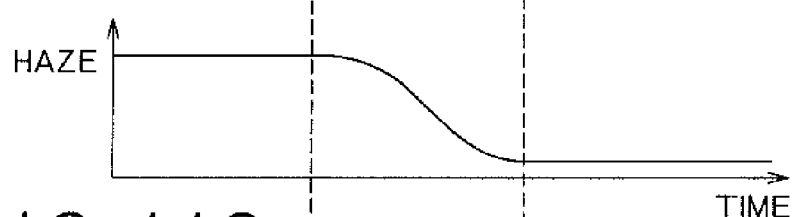
Figure 11C:
Figure 11D:
Figure 11E:
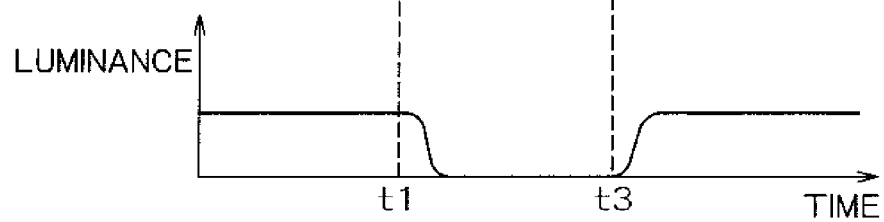

Specifically, for a display device in the wide-angle display state, the control circuit 201 receives the instruction for switching to wide-angle display, whereupon the output current of the light source drive circuit 202 is turned OFF, as shown in FIG. 11C, and the LED constituting the light source 51 is turned off, as shown in FIG. 11D. At the same time, the transparent/scattering element drive circuit 203 is controlled so that the transparent/scattering state switching element 122 is placed in the transparent state, as shown in FIG. 11A. Specifically, the output voltage of the transparent/scattering element drive circuit 203 is turned ON, and the haze of the transparent/scattering state switching element 122 is reduced, as shown in FIG. 11B. As previously mentioned, the response of the transparent/scattering state switching element 122 in the OFF state is slower than the response of the LED, and a relatively long time is required until the haze increases and becomes saturated after the voltage is applied. However, since the light source is turned off, the frontal luminance of the display screen is still zero, and the display screen is unaffected by the mid-transition state of the transparent/scattering state switching element 122. An instruction for switching to the narrow-angle display state is then presented to the light source drive circuit 202 at the stage in which the change to the transparent state by the transparent/scattering state switching element 122 is adequately completed, the output current of the light source drive circuit 202 is increased, and the LED is turned on, as shown in FIG. 11D. As a result, the frontal luminance is still zero, and abnormal flashing in which the luminance of the display screen suddenly increases for a brief period can be suppressed since the light source 51 is turned off during the period in which the transparent/scattering state switching element 122 changes to the transparent state as shown in FIG. 11E.

In the present embodiment, not only is it possible to suppress abnormal flashing in which the luminance of the display screen suddenly increases for a brief period during switching, but by turning off the light source during the switching transition period, the changeover can be indicated to the main user positioned in front of the display device. Specifically, as in the first embodiment, if there is absolutely no change in the luminance in the frontal direction when the viewing angle is switched, it is impossible for the main user in front of the display device to confirm that the switching operation has occurred. In contrast, since switching is accompanied by a screen blackout when the light source is turned off during switching as in the present embodiment, the main user in front of the screen can confirm that the switching operation has occurred.

In the description above, the light source was turned off while the haze of the transparent/scattering state switching element was changing, but the present invention is not limited to this configuration, and the light source may also be turned on insofar as the same effects can be demonstrated. For example, while the haze of the transparent/scattering state switching element is changing, the intensity of the light source may be set to a lower value than the intensity before and after the change in haze.

Figure 12:
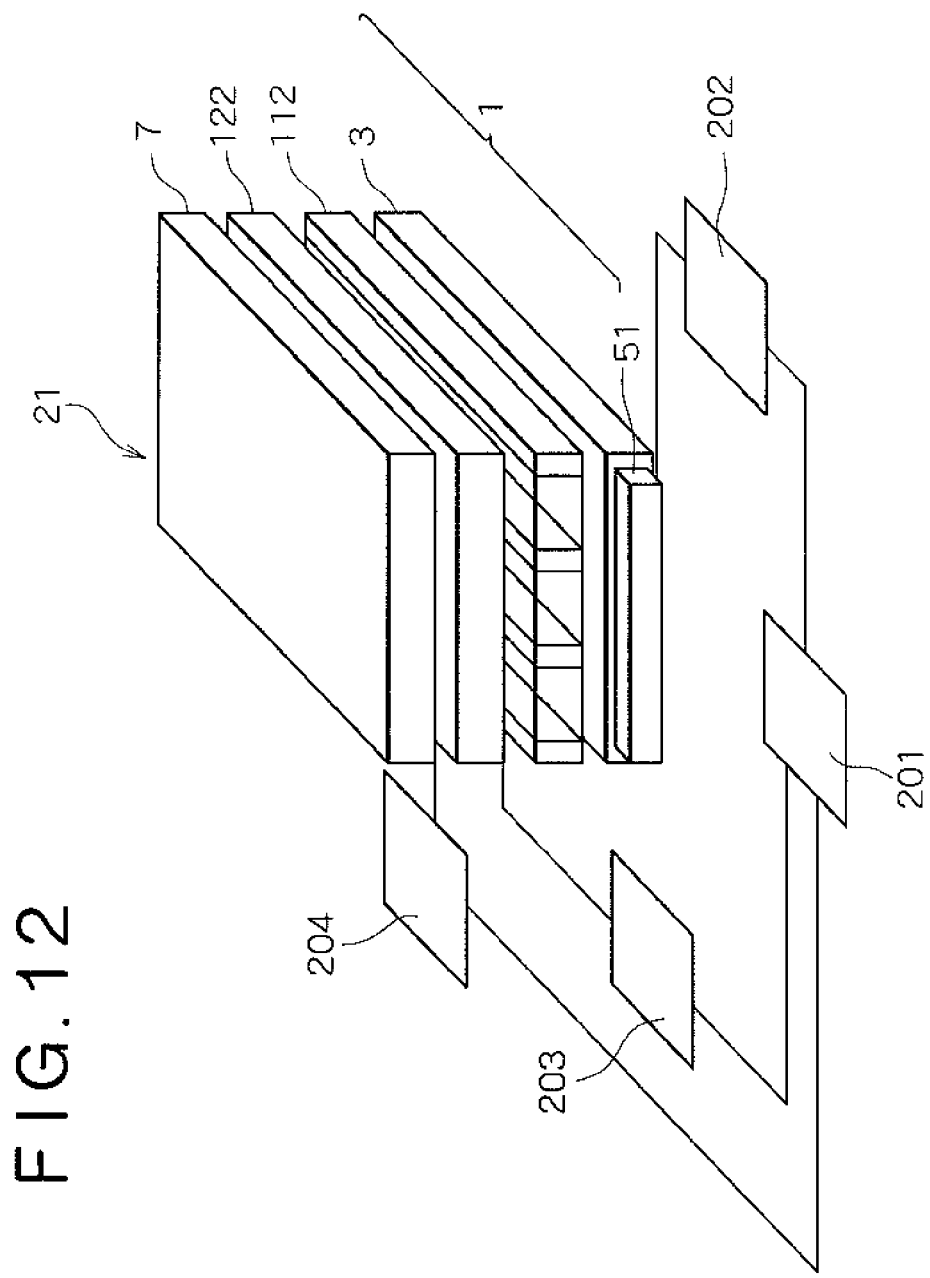
FIG. 12 is a perspective view showing the display device according to a fourth embodiment of the present invention.

The planar light source device, display device, terminal device, and method for driving a planar light source device according to a fourth embodiment of the present invention will next be described. FIG. 12 is a perspective view showing the display device according to the present embodiment. As shown in FIG. 12, a display panel drive circuit 204 for driving the transmissive liquid crystal panel 7 is connected to the control circuit 201, and this display panel drive circuit 204 is placed under the control of the control circuit 201 in the display device 21 according to the present fourth embodiment. The control circuit 201, light source drive circuit 202, transparent/scattering element drive circuit 203, and display panel drive circuit 204 constitute the control unit. Other aspects of the present embodiment are the same as those of the aforementioned first embodiment.

The operation of the display device according to the present embodiment thus configured, specifically, the method for driving the planar light source device according to the present embodiment, will next be described. FIGS. 13A through 13F are timing charts showing the state change when the display device according to the present embodiment is switched from narrow-angle display to wide-angle display, wherein time is plotted on the horizontal axis of each chart, FIG. 13A has the output voltage of the drive circuit for the transparent/scattering state switching element plotted on the vertical axis, FIG. 13B has the haze of the transparent/scattering state switching element plotted on the vertical axis, FIG. 13C has the output current of the light source drive circuit plotted on the vertical axis, FIG. 13D has the intensity of the light source plotted on the vertical axis, FIG. 13E has the transmittance of the transmissive liquid crystal display panel plotted on the vertical axis, and FIG. 13F has the frontal luminance of the display device plotted on the vertical axis. FIGS. 14A through 14F are timing charts showing the state change when the display device according to the present embodiment is switched from wide-angle display to narrow-angle display, wherein time is plotted on the horizontal axis of each chart, FIG. 14A has the output voltage of the drive circuit for the transparent/scattering state switching element plotted on the vertical axis, FIG. 14B has the haze of the transparent/scattering state switching element plotted on the vertical axis, FIG. 14C has the output current of the light source drive circuit plotted on the vertical axis, FIG. 14D has the intensity of the light source plotted on the vertical axis, FIG. 14E has the transmittance of the transmissive liquid crystal display panel plotted on the vertical axis, and FIG. 14F has the frontal luminance of the display device plotted on the vertical axis.

Figure 13A:
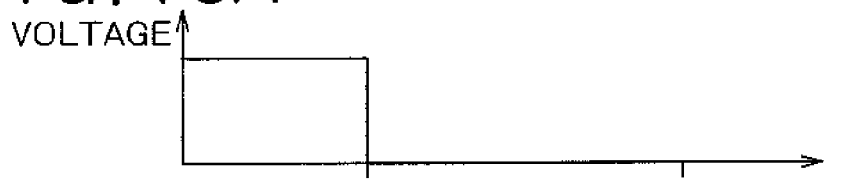
FIGS. 13A through 13F are timing charts showing the state change when the display device according to the present embodiment is switched from narrow-angle display to wide-angle display, wherein time is plotted on the horizontal axis of each chart, FIG. 13A has the output voltage of the drive circuit for the transparent/scattering state switching element plotted on the vertical axis, FIG. 13B has the haze of the transparent/scattering state switching element plotted on the vertical axis, FIG. 13C has the output current of the light source drive circuit plotted on the vertical axis, FIG. 13D has the intensity of the light source plotted on the vertical axis.
Figure 13B:
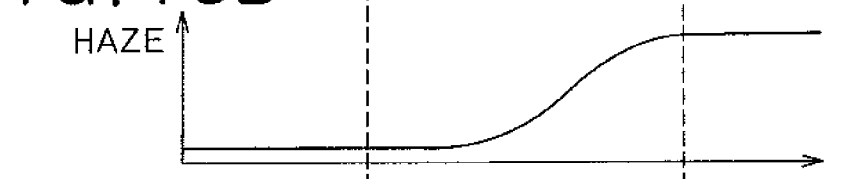
Figure 13C:
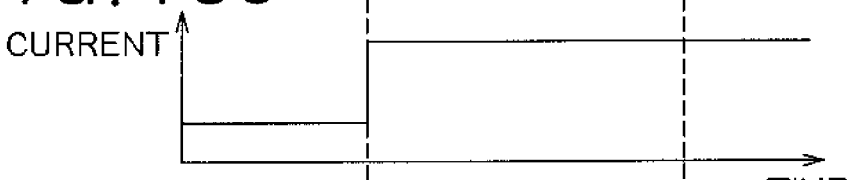
Figure 13D:
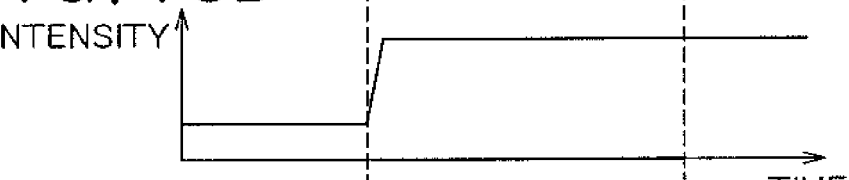
Figure 13E:
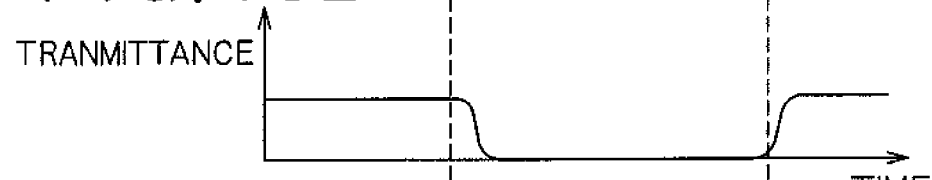
Figure 13F:
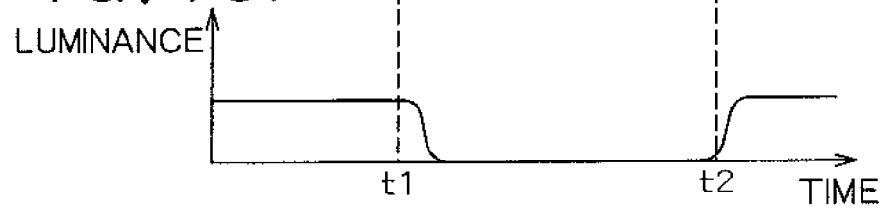

The narrow-to-wide angle switching operation will first be described. In the present embodiment, as shown in FIG. 13B, the transmittance of the transmissive liquid crystal panel 7 decreases to nearly zero, as shown in FIG. 13E, during the period in which the haze of the transparent/scattering state switching element 122 is changing, as shown in FIG. 13B. The frontal luminance during this period is therefore nearly zero, as shown in FIG. 13F. Black color may be displayed on the entire screen, for example, in order to reduce the transmittance of the transmissive liquid crystal panel 7. After the change in the haze of the transparent/scattering state switching element 122 is completed, the display on the transmissive liquid crystal panel 7 is returned to normal. The response time of a common transmissive liquid crystal display panel is about 20 milliseconds, which is shorter than the response time of the transparent/scattering state switching element.

Figure 14A:
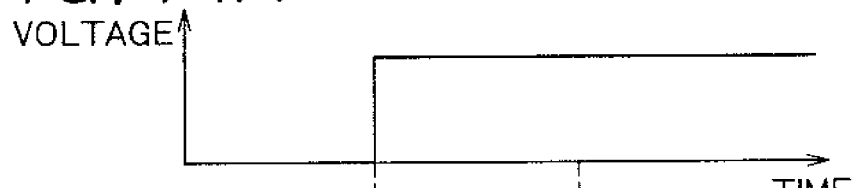
FIGS. 14A through 14F are timing charts showing the state change when the display device according to the present embodiment is switched from wide-angle display to narrow-angle display, wherein time is plotted on the horizontal axis of each chart, FIG. 14A has the output voltage of the drive circuit for the transparent/scattering state switching element plotted on the vertical axis, FIG. 14B has the haze of the transparent/scattering state switching element plotted on the vertical axis, FIG. 14C has the output current of the light source drive circuit plotted on the vertical axis, FIG. 14D has the intensity of the light source plotted on the vertical axis, FIG. 14E has the transmittance of the transmissive liquid crystal display panel plotted on the vertical axis, and FIG. 14F has the frontal luminance of the display device plotted on the vertical axis.
Figure 14B:
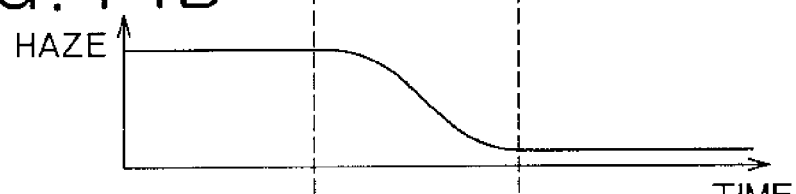
Figure 14C:
Figure 14D:
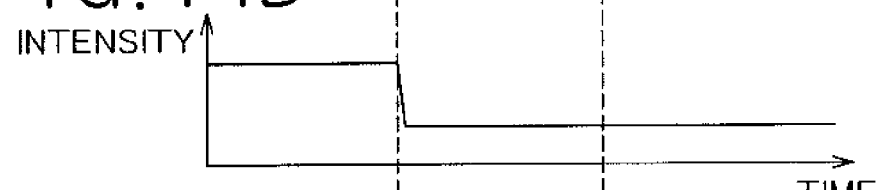
Figure 14E:
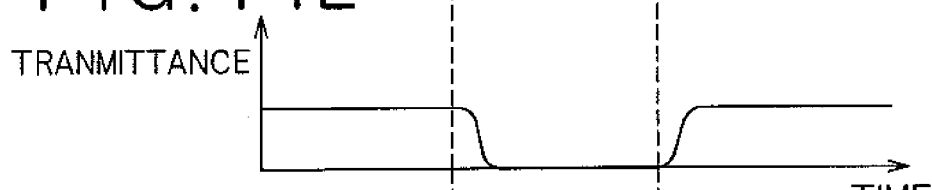
Figure 14F:
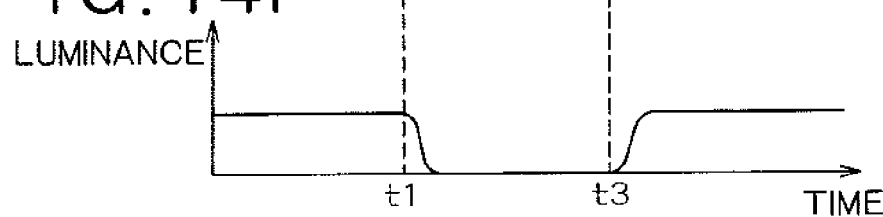
Figure 15:
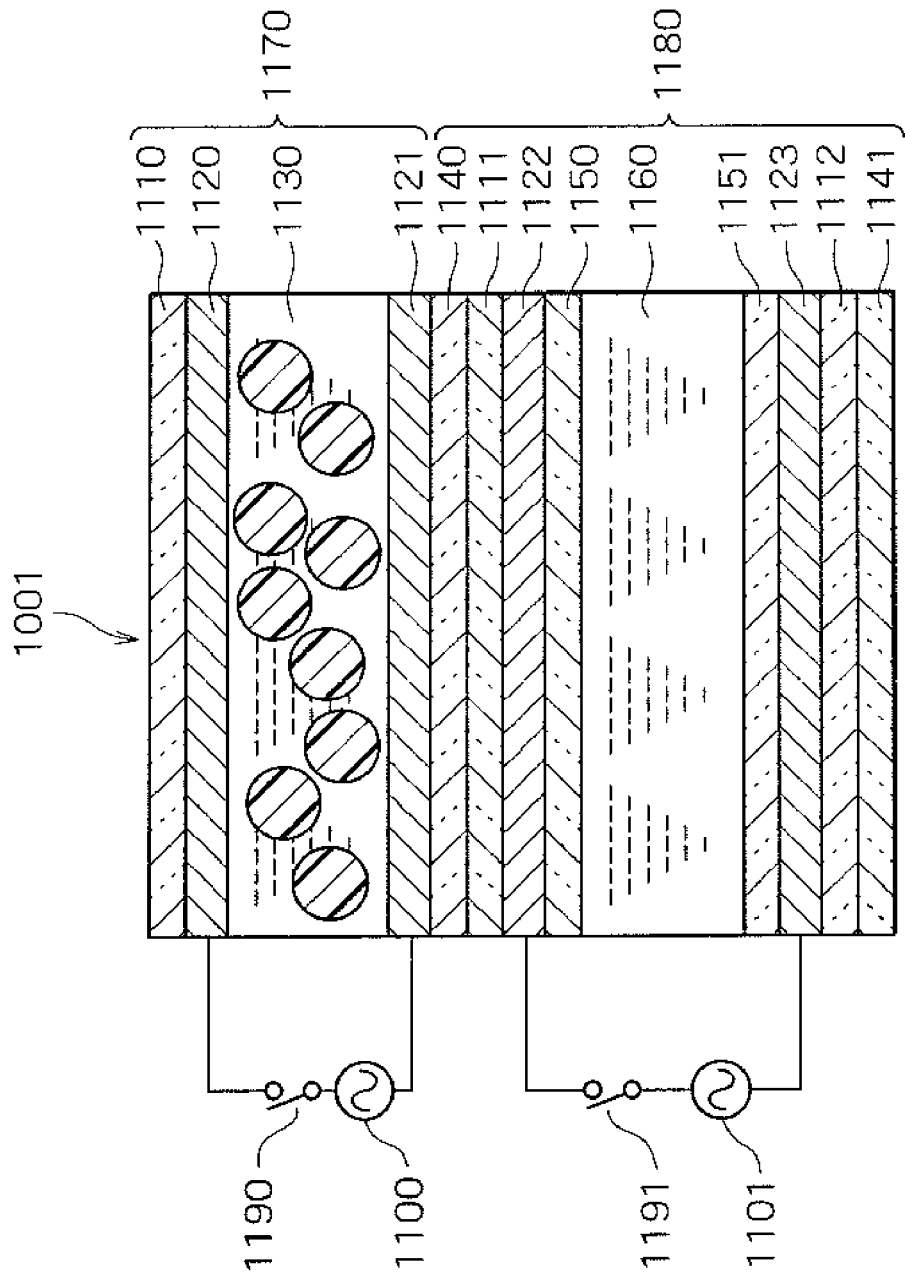
FIG. 15 is a schematic sectional view showing the first conventional viewing-angle-controlled liquid crystal display device.
Figure 16:
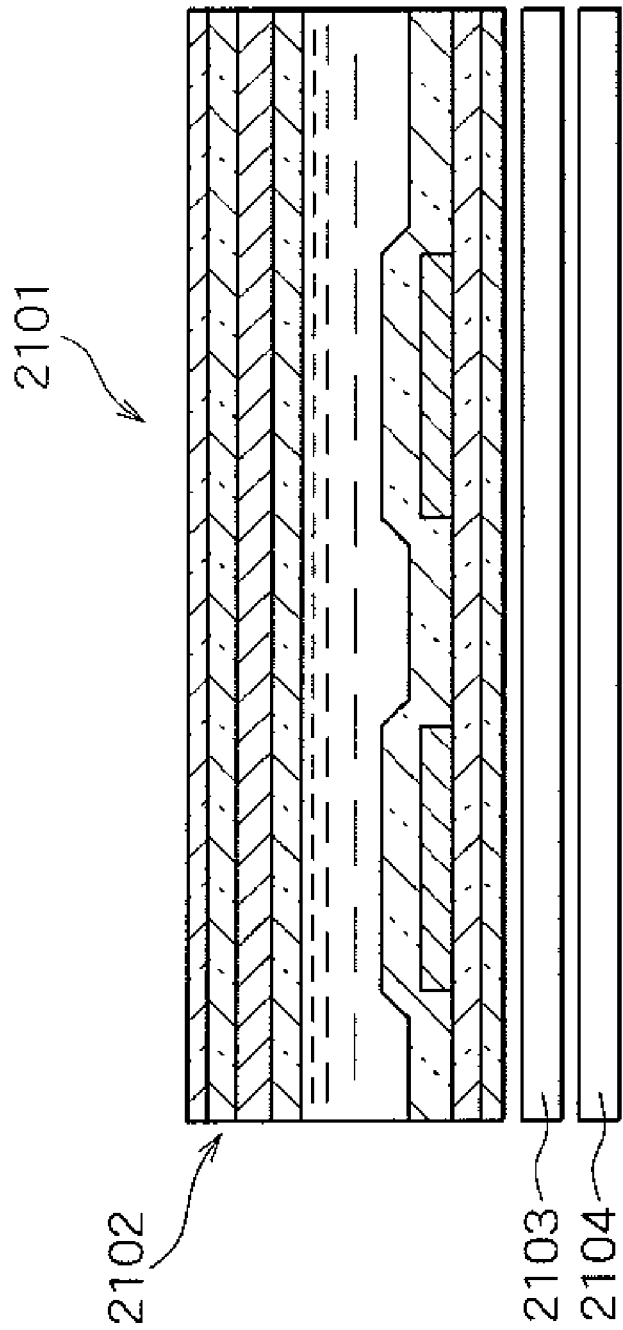
FIG. 16 is a schematic sectional view showing the second conventional viewing-angle-controlled liquid crystal display device.
Figure 17:
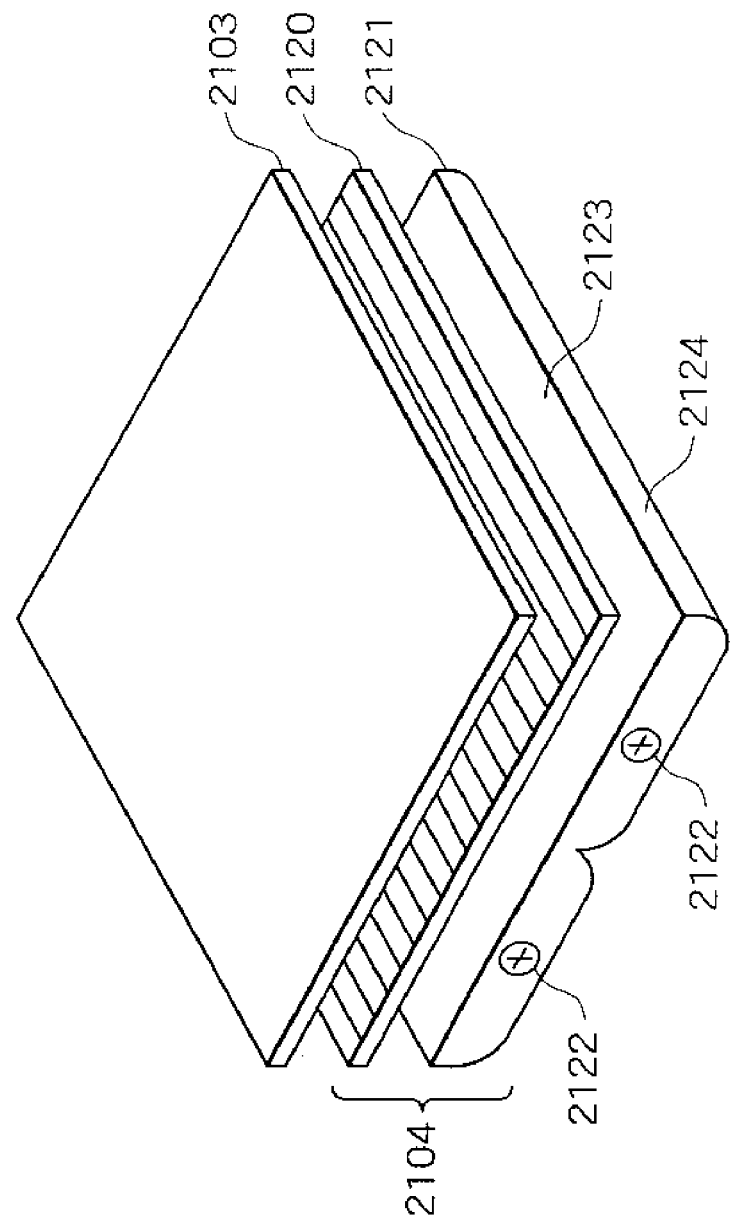
FIG. 17 is a schematic perspective view showing the illumination device used in the same second conventional viewing-angle-controlled liquid crystal display device.

The wide-to-narrow angle switching operation will next be described. In the same manner as during the narrow-to-wide angle switching operation, the transmittance of the transmissive liquid crystal panel 7 decreases to nearly zero, as shown in FIG. 14E, during the period in which the haze of the transparent/scattering state switching element 122 is changing, as shown in FIG. 14B. The frontal luminance during this period is therefore nearly zero, as shown in FIG. 14F. After the change in the haze of the transparent/scattering state switching element 122 is completed, the display on the transmissive liquid crystal panel 7 is returned to normal. Other aspects of the present embodiment are the same as those of the aforementioned first embodiment.

By the present embodiment, the same effects as those of the third embodiment can be obtained by reducing the transmittance of the transmissive liquid crystal panel 7 when the display is switched. Special adjustment of the light source or the transparent/scattering state switching element is also not required in the present embodiment, and abnormal flashing can easily be suppressed by changing the content displayed by the transmissive liquid crystal display panel.

Thus, the present invention can be suitable for use as the display device of a mobile telephone, a PDA, a gaming device, a digital camera, a video camera, a video player, or other mobile terminal device, and as the display device of a notebook-type personal computer, a cash dispenser, a vending machine, or other terminal device.

What is claimed is:

1. A planar light source device comprising:
   a light source unit for emitting light in a plane;
   a transparent/scattering state switching element capable of switching between a transparent state for transmitting the light incident from the light source unit, and a scattering state for scattering the light; and
   a control unit for controlling an intensity of said light source unit and a state of said transparent/scattering state switching element; wherein
   said control unit controls the intensity of said light source unit to be a first light intensity when said transparent/scattering state switching element is in said transparent state, controls the intensity of said light source unit to be a second light intensity, that is higher than the first light intensity, when said transparent/scattering state switching element is in said scattering state, and controls the intensity of said light source unit to be lower than the first light intensity and the second light intensity during a transition in which said transparent/scattering state switching element is transferred from said transparent state to said scattering state.

2. The planar light source device according to claim 1, wherein said control unit increases the intensity of said light source unit after said transition is completed in said transparent/scattering state switching element.

3. The planar light source device according to claim 1, wherein said control unit reduces the intensity of said light source unit before the start of the transition from said scattering state to said transparent state by said transparent/scattering state switching element.

* * * * *